(12) United States Patent
Kobayashi et al.

(10) Patent No.: US 11,785,203 B2
(45) Date of Patent: Oct. 10, 2023

(54) INFORMATION PROCESSING APPARATUS, INFORMATION PROCESSING METHOD, AND PROGRAM

(71) Applicant: SONY GROUP CORPORATION, Tokyo (JP)

(72) Inventors: Yuto Kobayashi, Kanagawa (JP); Noriaki Takahashi, Tokyo (JP); Takaaki Suzuki, Kanagawa (JP); Haruka Mitsumori, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 115 days.

(21) Appl. No.: 17/438,235

(22) PCT Filed: Mar. 5, 2020

(86) PCT No.: PCT/JP2020/009537
§ 371 (c)(1),
(2) Date: Sep. 10, 2021

(87) PCT Pub. No.: WO2020/189319
PCT Pub. Date: Sep. 24, 2020

(65) Prior Publication Data
US 2022/0217324 A1    Jul. 7, 2022

(30) Foreign Application Priority Data

Mar. 19, 2019 (JP) .................................. 2019-050622

(51) Int. Cl.
*G02B 30/50* (2020.01)
*H04N 13/383* (2018.01)
(Continued)

(52) U.S. Cl.
CPC ........... *H04N 13/383* (2018.05); *H04N 13/32* (2018.05); *H04N 13/398* (2018.05)

(58) Field of Classification Search
CPC .... H04N 13/383; H04N 13/32; H04N 13/398; H04N 13/302; H04N 13/366; H04N 2013/405; G02B 30/00
(Continued)

(56) References Cited

U.S. PATENT DOCUMENTS 6,233,004 B1 * 5/2001 Tanaka ....................... G06T 7/55
                                                    348/E13.058
6,400,364 B1 * 6/2002 Akisada .................. G06T 15/20
                                                    715/757
(Continued)

FOREIGN PATENT DOCUMENTS

JP       H06-148763 A      5/1994
JP       2006-126542 A     5/2006
(Continued)

*Primary Examiner* — Gims S Philippe
(74) *Attorney, Agent, or Firm* — Paratus Law Group, PLLC

(57) ABSTRACT

An information processing apparatus (30) includes: a specification unit (331) that specifies a viewpoint position of an observer of a display device (10) that reproduces rays of light that have been sent out by a three-dimensional object; a setting unit (332) that sets a region that makes it possible for the observer to stereoscopically view the three-dimensional object, by using, as a reference, the viewpoint position that has been specified by the specification unit (331); and a display control unit (333) that performs control to cause the display device (10) to emit a ray-of-light group that makes it possible to stereoscopically view the three-dimensional object from an inside of the region that has been set by the setting unit (332), and makes it impossible to stereoscopically view the three-dimensional object from an outside of the region.

10 Claims, 11 Drawing Sheets

(51) Int. Cl.
*H04N 13/32* (2018.01)
*H04N 13/398* (2018.01)

(58) Field of Classification Search
USPC .......................................................... 348/51
See application file for complete search history.

(56) References Cited

U.S. PATENT DOCUMENTS

| | | | | |
|---|---|---|---|---|
| RE41,414 E | * | 7/2010 | Yamamoto | G06T 15/10 |
| | | | | 345/629 |
| 2013/0135311 A1 | * | 5/2013 | Kaneko | H04N 13/178 |
| | | | | 345/427 |
| 2013/0148045 A1 | * | 6/2013 | Ohyama | G09G 3/003 |
| | | | | 349/15 |
| 2015/0085089 A1 | * | 3/2015 | Shigemura | H04N 13/351 |
| | | | | 348/54 |
| 2017/0289530 A1 | * | 10/2017 | Smithwick | H04N 13/305 |

FOREIGN PATENT DOCUMENTS

| | | |
|---|---|---|
| JP | 2008-146221 A | 6/2008 |
| JP | 2010-113160 A | 5/2010 |
| JP | 2015-504641 A | 2/2015 |
| JP | 2018-085727 A | 5/2018 |

\* cited by examiner

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2020/009537 (filed on Mar. 5, 2020) under 35 U.S.C. § 371, which claims priority to Japanese Patent Application No. 2019-050622 (filed on Mar. 19, 2019), which are all hereby incorporated by reference in their entirety.

TECHNICAL FIELD

The present disclosure relates to an information processing apparatus, an information processing method, and a program.

BACKGROUND ART

Some conventional display devices achieve a stereoscopic image display. Patent Document 1 discloses an image display system that includes an image display device that displays a stereoscopic image by using a ray-of-light regeneration method.

CITATION LIST

Patent Document

Patent Document 1: Japanese Patent Application Laid-Open No. 2008-146221

SUMMARY OF THE INVENTION

Problems to be Solved by the Invention

In the conventional technology described above, a motion parallax is achieved in all of the three-dimensional directions by using the ray-of-light regeneration method, and therefore it is difficult to simplify a configuration of a device that regenerates rays of light in all of the three-dimensional directions. Furthermore, a device that regenerates rays of light regenerates rays of light in all of the three-dimensional directions, and therefore there is a possibility of causing an unnatural image to be visually recognized according to processing performance of the device.

Accordingly, the present disclosure proposes an information processing apparatus, an information processing method, and a program that are capable of causing a stereoscopic image to be visually recognized by using rays of light, even if a processing load relating to emission of rays of light is reduced.

Solutions to Problems

In order to solve the problems described above, an information processing apparatus according to an embodiment of the present disclosure includes: a specification unit that specifies a viewpoint position of an observer of a display device that reproduces rays of light that have been sent out by a three-dimensional object; a setting unit that sets a region that makes it possible for the observer to stereoscopically view the three-dimensional object, by using, as a reference, the viewpoint position that has been specified by the specification unit; and a display control unit that performs control to cause the display device to emit a ray-of-light group that makes it possible to stereoscopically view the three-dimensional object from an inside of the region that has been set by the setting unit, and makes it impossible to stereoscopically view the three-dimensional object from an outside of the region.

Furthermore, an information processing method according to an embodiment of the present disclosure is an information processing method performed by an information processing apparatus that controls a display device that reproduces rays of light that have been sent out by a three-dimensional object. The information processing method includes: a step of specifying a viewpoint position of an observer of the display device; a step of setting a region that makes it possible for the observer to stereoscopically view the three-dimensional object, by using, as a reference, the viewpoint position that has been specified; and a step of performing control to cause the display device to emit a ray-of-light group that makes it possible to stereoscopically view the three-dimensional object from an inside of the region that has been set, and makes it impossible to stereoscopically view the three-dimensional object from an outside of the region.

Furthermore, a program according to an embodiment of the present disclosure causes an information processing apparatus that controls a display device that reproduces rays of light that have been sent out by a three-dimensional object to perform: a step of specifying a viewpoint position of an observer of the display device; a step of setting a region that makes it possible for the observer to stereoscopically view the three-dimensional object, by using, as a reference, the viewpoint position that has been specified; and a step of performing control to cause the display device to emit a ray-of-light group that makes it possible to stereoscopically view the three-dimensional object from an inside of the region that has been set, and makes it impossible to stereoscopically view the three-dimensional object from an outside of the region.

MODE FOR CARRYING OUT THE INVENTION

An embodiment of the present disclosure is described in detail below with reference to the drawings. Note that in each of the embodiments described below, the same portion is denoted by the same reference sign, and therefore a duplicate description is omitted.

Embodiment

[Outline of Display System According to Embodiment]

Figure 1:
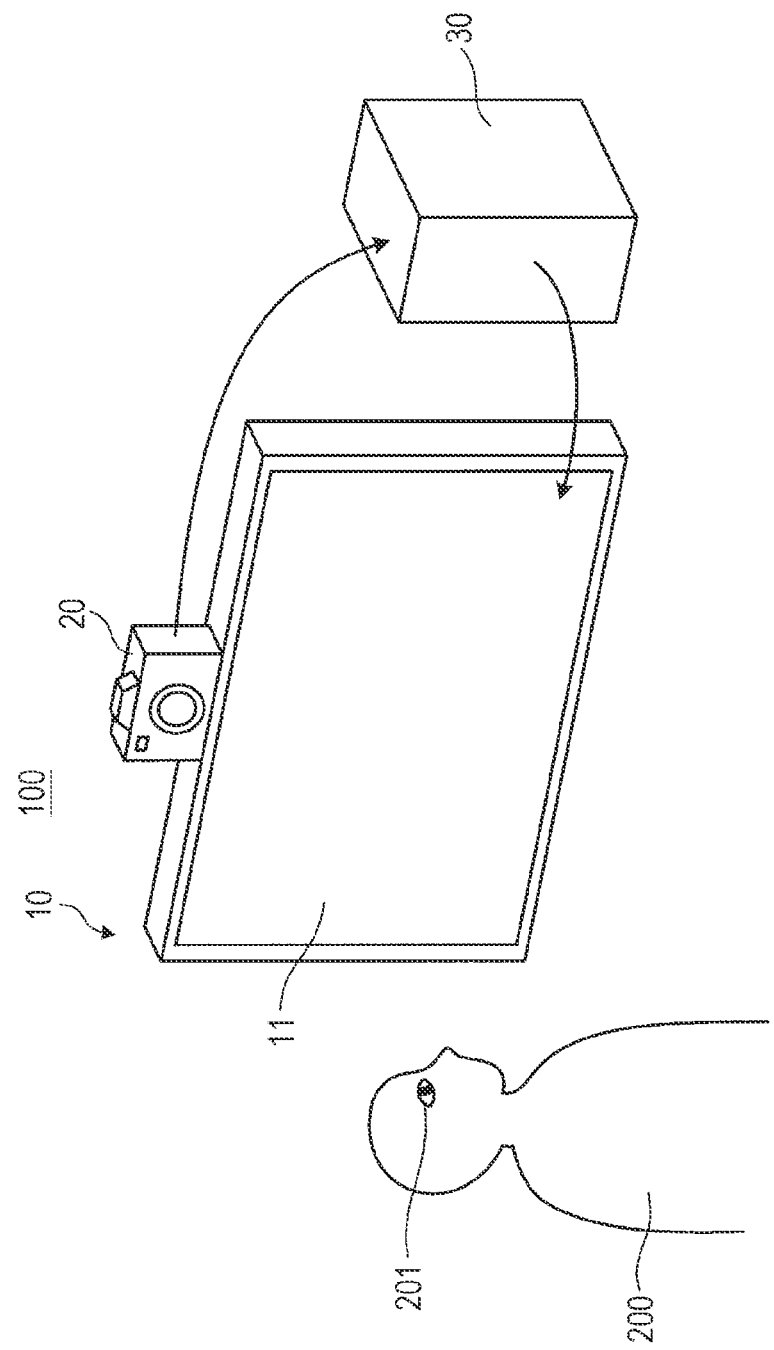
FIG. 1 is a diagram illustrating a schematic configuration of a display system that includes an information processing apparatus according to an embodiment.

FIG. 1 is a diagram illustrating a schematic configuration of a display system that includes an information processing apparatus according to an embodiment. A display system 100 illustrated in FIG. 1 causes an observer 200 to visually recognize a three-dimensional object in a stereoscopic manner by using a ray-of-light group emitted from a display device 10. The display system 100 includes the display device 10, a measurement device 20, and an information processing apparatus 30. The information processing apparatus 30 can perform communication with the display device 10 and the measurement device 20.

The display device 10 is a light field display that reproduces rays of light that have been sent out by a three-dimensional object. The display device 10 of a light field scheme is a device that causes the observer 200 to visually recognize a stereoscopic video or the like with naked eyes without using dedicated glasses. For example, a three-dimensional object to be visually recognized sends out rays of light in various directions. The rays of light mean light obtained by reflecting sunlight, illumination, or the like. A human or the like stereoscopically recognizes a three-dimensional object, by grasping rays of light that have been sent out by the object. The display device 10 makes it possible to stereoscopically view a three-dimensional object, by reproducing, in a pseudo manner, rays of light that have been sent out by the three-dimensional object. The display device 10 reproduces rays of light that have been sent out by a three-dimensional object according to a scheme of reproducing rays of light that have been sent out by a three-dimensional object under the control of the information processing apparatus 30. As the display device 10, for example, a will-known device that regenerates rays of light according to a panel laminated scheme, a projector array scheme, a parallax barrier/lens array scheme, or the like can be used.

For example, the display device 10 can use a ray-of-light regeneration scheme that can change a region in which rays of light will be reproduced, by performing signal processing. In the present embodiment, a case where a display of the panel laminated scheme is used, for example, as the display device 10 is described. The display device 10 can change a ray of light to be emitted from a pixel, for example, by changing a plurality of pixel values of a liquid crystal panel 11.

The measurement device 20 is provided in an upper portion of the display device 10 in such a way that a position or the like of an eye 201 of the observer 200 who observes the display device 10 can be measured. As the measurement device 20, for example, a single device of an RGB camera, an IR camera, a depth camera, an ultrasonic sensor, or the like, or a combination thereof can be used. The measurement device 20 may perform measurement at all times, or may perform measurement periodically. The measurement device 20 transmits measurement information indicating a result of measurement to the information processing apparatus 30 in wireless communication or wired communication. A measurement result includes, for example, information that can identify a position, a distance, or the like of the head, a left or right eye 201, or the like of the observer 200 in a space where the liquid crystal panel 11 can be visually recognized. The measurement result includes, for example, an image of the left or right eye 201 or the like of the observer 200.

[Configuration of Information Processing Apparatus According to Embodiment]

Figure 2:
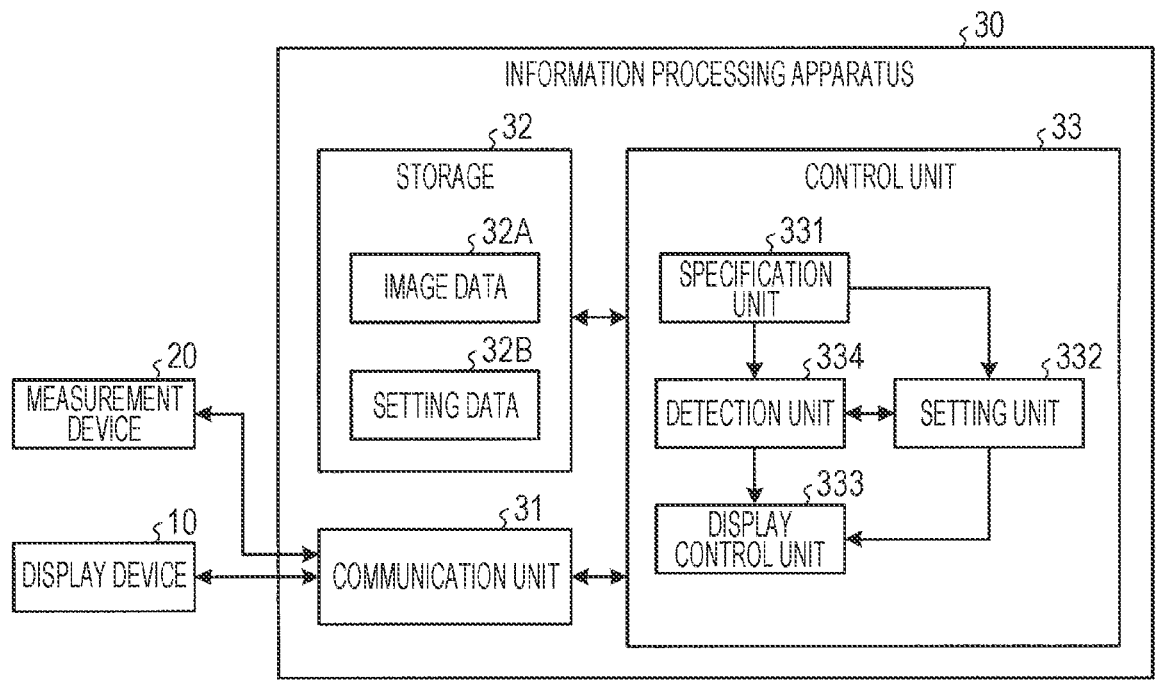
FIG. 2 is a diagram illustrating an example of a configuration of the information processing apparatus according to the embodiment.

FIG. 2 is a diagram illustrating an example of a configuration of the information processing apparatus 30 according to the embodiment. The information processing apparatus 30 illustrated in FIG. 2 is, for example, a dedicated or general-purpose computer. The information processing apparatus 30 includes a communication unit 31, a storage 32, and a control unit 33. The information processing apparatus 30 is provided, for example, outside the display device 10, but this is not restrictive. For example, the information processing apparatus 30 may be incorporated into the display device 10. The control unit 33 of the information processing apparatus 30 is electrically connected to the communication unit 31 and the storage 32.

The communication unit 31 has a function of performing communication with the display device 10 and the measurement device 20 directly or via a network. The communication unit 31 is, for example, a communication device that can perform wired communication or wireless communication. The communication unit 31 outputs, to the control unit 33, information that has been received from the display device 10 and the measurement device 20. The communication unit 31 transmits information, a signal, or the like that has been input from the control unit 33 to the display device 10, the measurement device 20, or the like. Note that the communication unit 31 may include, for example, a connector that is connected to a cable or the like.

The storage 32 stores each type of data and program. The storage 32 is implemented, for example, by a semiconductor memory element such as a RAM or a flash memory, or a storage device such as a hard disk or an optical disk. The storage 32 stores a measurement result of the measurement device 20 in a time-series manner. The storage 32 stores image data 32A to be regenerated by the display device 10, setting data 32B, or the like. The image data 32A includes, for example, information indicating an image group at a time when an observer has observed a three-dimensional object from all angles. The setting data 32B includes, for example, information relating to a region, coordinates, or the like that have been set for the eye 201 of the observer 200. The setting data 32B includes, for example, information for setting a region by using a viewpoint position as a reference.

The control unit 33 controls the information processing apparatus 30. The control unit 33 includes respective processing units, a specification unit 331, a setting unit 332, a display control unit 333, and a detection unit 334. In the present embodiment, the respective processing units of the control unit 33, including the specification unit 331, the setting unit 332, the display control unit 333, and the detection unit 334, are implemented, for example, by a central processing unit (CPU), a micro control unit (MCU), or the like executing a program stored in the information processing apparatus 30 by using a random access memory (RAM) or the like as a working area. Furthermore, the respective processing units may be implemented, for example, by an integrated circuit such as an application specific integrated circuit (ASIC) or a field-programmable gate array (FPGA).

The specification unit 331 specifies a viewpoint position of the observer 200 of the display device 10 that displays a three-dimensional object. The specification unit 331 specifies the viewpoint position, for example, on the basis of a measurement result of the measurement device 20 that has been acquired via the communication unit 31. The specification unit 331 may specify the viewpoint position by using various known techniques. For example, the specification unit 331 specifies information relating to a position, a distance from the measurement device 20, and the like of the eye 201 of the observer 200 from the measurement result of the measurement device 20, and specifies viewpoint positions of the left eye and the right eye of the observer 200 on the basis of the specified information. The viewpoint position indicates a position in a viewpoint coordinate system that has been set for the observer 200. Furthermore, the specification unit 331 may specify a direction that a line-of-sight of the right eye faces, for example, on the basis of a captured image of an eyeball of the right eye of the observer 200 and a positional relationship with the right eye. Similarly, the specification unit 331 may specify a direction that a line-of-sight of the left eye faces on the basis of a captured image of an eyeball of the left eye of a user and a positional relationship with the left eye.

The specification unit 331 may specify which position of the liquid crystal panel 11 is visually recognized, on the basis of a position of the eye 201 of the observer 200. The specification unit 331 may cause a specification result to include specification precision of the viewpoint position of the observer 200. For example, in a case where a position of the eye 201 of the observer 200 has failed to be grasped on the basis of an image or the like and the viewpoint position has been estimated on the basis of a position, a shape, or the like of the head of the observer 200, the specification unit 331 may cause a specification result to include information indicating low specification precision. For example, in a case where the precision of the measurement device 20 includes uncertainty and has a certain distribution of probability, the specification unit 331 may specify a position, a range, or the like in which a viewpoint is likely to be located, by using the probability as a weight. Then, the specification unit 331 stores the specified viewpoint position of the observer 200 in the storage 32, and also outputs the viewpoint position to the setting unit 332.

The setting unit 332 sets a region that makes it possible for the observer 200 to stereoscopically view a three-dimensional object, by using, as a reference, the viewpoint position specified by the specification unit 331. The setting unit 332 sets a region around the viewpoint position that makes it possible to stereoscopically view a three-dimensional object even if the viewpoint position of the observer 200 slightly deviates. For example, the setting unit 332 may set a region having a size that has been set in advance, by using the viewpoint position of the observer 200 as a reference. For example, the setting unit 332 may set a region that changes according to an observer 200, by using the viewpoint position of the observer 200 as a reference. For example, the setting unit 332 may set a region having a range that surrounds the eye 201 of the observer 200 with the viewpoint position as a center. The region includes, for example, a plane, a stereoscopic space, or the like. For example, the setting unit 332 may set a region having a size that changes according to the expression capability of the display device 10, the specifications of the information processing apparatus 30, or the like. For example, the setting unit 332 may set a first region having a wider range in the case of an observer 200 who has a tendency for a viewpoint to move more frequently, and may set a second region having a size that is smaller than a size of the first region in the case of an observer 200 who has a tendency for a viewpoint to move less frequently. Then, the setting unit 332 stores, in the storage 32, region information indicating the set region, and also outputs the region information to the display control unit 333.

In the present embodiment, a case where the setting unit 332 sets two regions that correspond to the left eye and the right eye of the observer 200 is described, but this is not restrictive. For example, the setting unit 332 may set a single region that includes both the left eye and the right eye of the observer 200. For example, in a case where it is sufficient if rays of light of either the left eye or the right eye of the observer 200 are reproduced, the setting unit 332 may set a region that uses a viewpoint position of one eye 201 as a reference. Furthermore, the setting unit 332 can reduce the number of rays of light to be reproduced by imposing restrictions on dimensions, a size, or the like per region.

The display control unit 333 performs control to cause the display device 10 to emit a ray-of-light group that makes it possible to stereoscopically view a three-dimensional object from an inside of the region that has been set by the setting unit 332, and makes it impossible to stereoscopically view the three-dimensional object from an outside of the region. Stated another way, the display control unit 333 causes the observer 200 to visually recognize a three-dimensional object by using rays of light that pass through the inside of the region from among the ray-of-light group emitted by the display device 10. For example, the display control unit 333 may control the display device 10 to continuously emit different rays of light to the inside of the region. The display control unit 333 can employ a scheme of changing a region in which rays of light will be reproduced by performing signal processing. For example, the display control unit 333 calculates what value each pixel of the display device 10 is to output, and controls the display device 10 according to a result of calculation. As a result, the display device 10 regenerates a pixel value from the display control unit 333 to emit rays of light that correspond to the pixel value. Note that an example of calculating a pixel value will be described later.

Furthermore, the display control unit 333 compares a ray-of-light group that passes through the region from the display device 10 with a virtual ray-of-light group that is desired to reproduce a three-dimensional object, and reflects a result of comparison in a ray-of-light group to be emitted by the display device. The display control unit 333 simulates rays of light that pass through the region from among a ray-of-light group emitted by the display device 10, compares the rays of light that have been simulated and pass through the region with the virtual ray-of-light group, and causes the display device 10 to emit a ray-of-light group based on a pixel value that reduces an error. For example, the display control unit 333 performs simulation to obtain a ray-of-light group that passes through the region in a current state and a virtual ray-of-light group to be reproduced, and contrasts them. In a case where there is a difference as a result of contrast, the display control unit 333 determines a pixel value that eliminates the difference.

The detection unit 334 detects a movement of a viewpoint of the observer 200. For example, the detection unit 334 compares the viewpoint position specified by the specification unit 331 with a previous viewpoint position. In a case where the viewpoint positions are different from each other or an amount of movement of the viewpoint is greater than or equal to a threshold, the detection unit 334 detects that the viewpoint has moved. For example, the detection unit 334 compares the viewpoint position specified by the specification unit 331 with the region set by the setting unit 332. In a case where the viewpoint position is located outside the region or is located close to the outside of the region, the detection unit 334 detects that the viewpoint has moved.

A configuration example of the information processing apparatus 30 according to the embodiment has been described above. Note that the configuration that has been described above with reference to FIG. 2 is merely an example, and a configuration of the information processing apparatus 30 according to the present embodiment is not limited to this example. A functional configuration of the information processing apparatus 30 according to the present embodiment can be flexibly changed according to specifications or operation.

[Method for Reproducing Rays of Light by Performing Signal Processing according to Embodiment]

Figure 3:
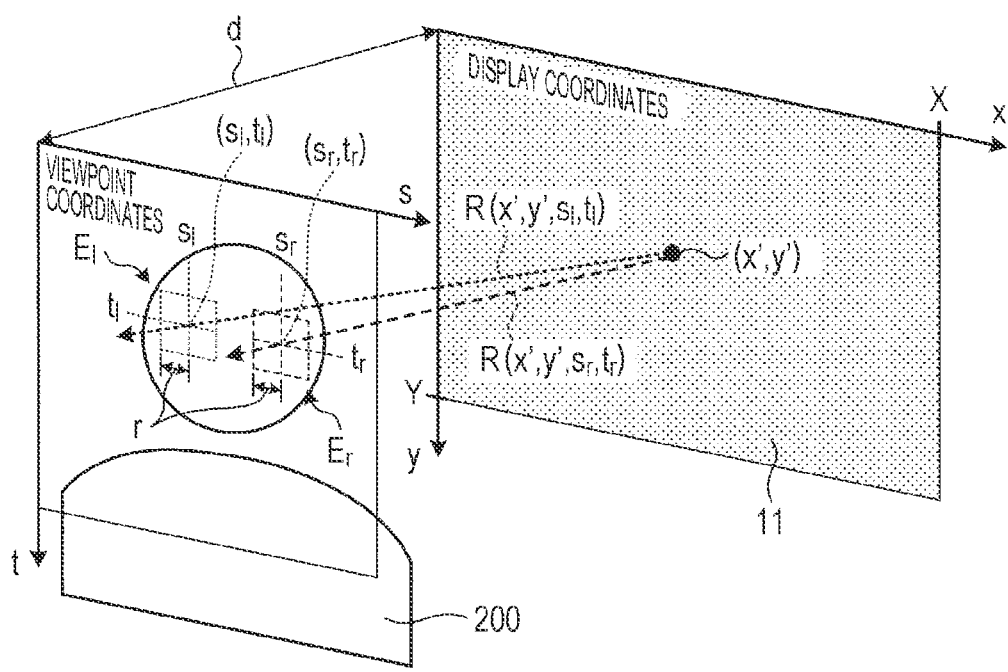
FIG. 3 is a diagram for explaining a viewpoint position in the information processing apparatus according to the embodiment.

FIG. 3 is a diagram for explaining a viewpoint position in the information processing apparatus 30 according to the embodiment. An xy coordinate system illustrated in FIG. 3 defines plane coordinates on a surface of the liquid crystal panel 11 of the display device 10. The xy coordinate system is an example of a display coordinate system. The xy coordinate system has an x-axis in a horizontal direction along a longer side of the liquid crystal panel 11 of the display device 10, and a y-axis in a vertical direction along a shorter side of the liquid crystal panel 11. An st coordinate system is a coordinate system that passes through the left and right eyes 201 of the observer 200 who is apart from the display device 10 by a distance d, and is parallel to the xy coordinate system. The st coordinate system is an example of a viewpoint coordinate system. The st coordinate system is plane coordinates that are defined in a depth of the viewpoint of the observer 200 who is apart from the display device 10 by the distance d. The st coordinate system has an s-axis along the horizontal direction, and a t-axis along the vertical direction.

In a three-dimensional space, two plane coordinates (the xy coordinate system and the st coordinate system) have been defined, and therefore all of the rays of light that are transmitted around in a space can be expressed. For example, a ray of light that passes through the point (x', y') in the xy coordinate system and the point (s,t) in the st coordinate system is expressed as R(x', y', s, t). In the description below, in a description in which coordinate positions of the left and right eyes 201 are distinguished from each other, the point $(s_l, t_l)$ and the point $(s_r, t_r)$ are used.

Next, a correspondence relationship between a ray of light that is transmitted around in a space and a pixel of the display device 10 is defined. The display device 10 can employ, for example, a panel laminated scheme, a projector array scheme, a parallax barrier/lens array scheme, or the like. A correspondence relationship between a ray of light and a pixel of the display device 10 changes according to schemes, and therefore in the present embodiment, details of the correspondence relationship are not described for the sake of versatility. Then, it is assumed that a set of pixels of the display device 10 is P, a transform function from P described above into rays of light is defined as f(P), and it is assumed that a correspondence relationship between each of the rays of light and a pixel of the display device 10 is expressed as Formula (1). Formula (1) indicates that f(P) is obtained if R(x', y', s, t) is obtained, and R(x', y', s, t) is obtained if f(P) is obtained.

$$R(x,y,s,t) <=> f(P) \qquad \text{Formula (1)}$$

Next, faithful reproduction of only a specified ray of light is formalized as an optimization problem. It is assumed that in a viewpoint position measured by the measurement device 20, position coordinates of the left eye are the point $(s_l, t_l)$, and position coordinates of the right eye are the point $(s_r, t_r)$. If it is assumed that a range in which contribution will be reproduced is a range of ±r from a position of each of the left and right eyes 201, the optimization problem is expressed as Formula (2).

[Formula 1]

$$P' = \arg_p \min \int_0^Y \int_0^X \int_{t_l-r}^{t_l+r} \int_{s_l-r}^{s_l+r} \|R(x, y, s, t) - f(P)\|^2 ds dt dx dy + \int_0^Y \int_0^X \int_{t_r-r}^{t_r+r} \int_{s_r-r}^{s_r+r} \|R(x, y, s, t) - f(P)\|^2 ds dt dx dy \qquad (2)$$

In Formula (2), R(x, y, s, t) is a luminance value of a ray of light to be reproduced that is given as an input. X and Y respectively correspond to a horizontal width and a vertical width of the liquid crystal panel 11 in the xy coordinate system. Stated another way, Formula (2) is an optimization problem that minimizes an error between a ray of light to be regenerated and a ray of light reproduced by the display device 10 in a ray-of-light group that passes through (x:[0, X], y:[0, Y]) on the liquid crystal panel 11, and passes through a peripheral region (s: $[s_l-r, s_l+r]$, t: $[t_l-r, t_l+r]$) of the left eye or a peripheral region (s: $[s_r-r, s_r+r]$, t: $[t_r-r, t_r+r]$) of the right eye, from among all of the rays of light that are transmitted around in a space.

A resolution of the optimization problem is obtained according to a technique based on a gradient effect. Specifically, the information processing apparatus 30 simulates a ray of light that will be reproduced in a current state (step S1). Then, the information processing apparatus 30 makes a comparison with a ray-of-light group to be reproduced that will be given as an input, and calculates an error (step S2). Then, if the error is less than or equal to a certain value, the information processing apparatus 30 terminates calculation. If the error exceeds the certain value, the information processing apparatus 30 updates a pixel value in such a way that the error becomes smaller, and the processing returns to step S1. Then, the information processing apparatus 30 can faithfully reproduce a ray of light only in regions $E_l$ and $E_r$, that are peripheral regions of the viewpoint of the observer 200, by reflecting a finally obtained pixel value P' of the display device 10 in the display device 10. Stated another way, the regions $E_l$ and $E_r$ serve as regions that make it possible for the observer 200 to stereoscopically view a three-dimensional object, by using a viewpoint position of the observer 200 as a reference.

Figure 4:
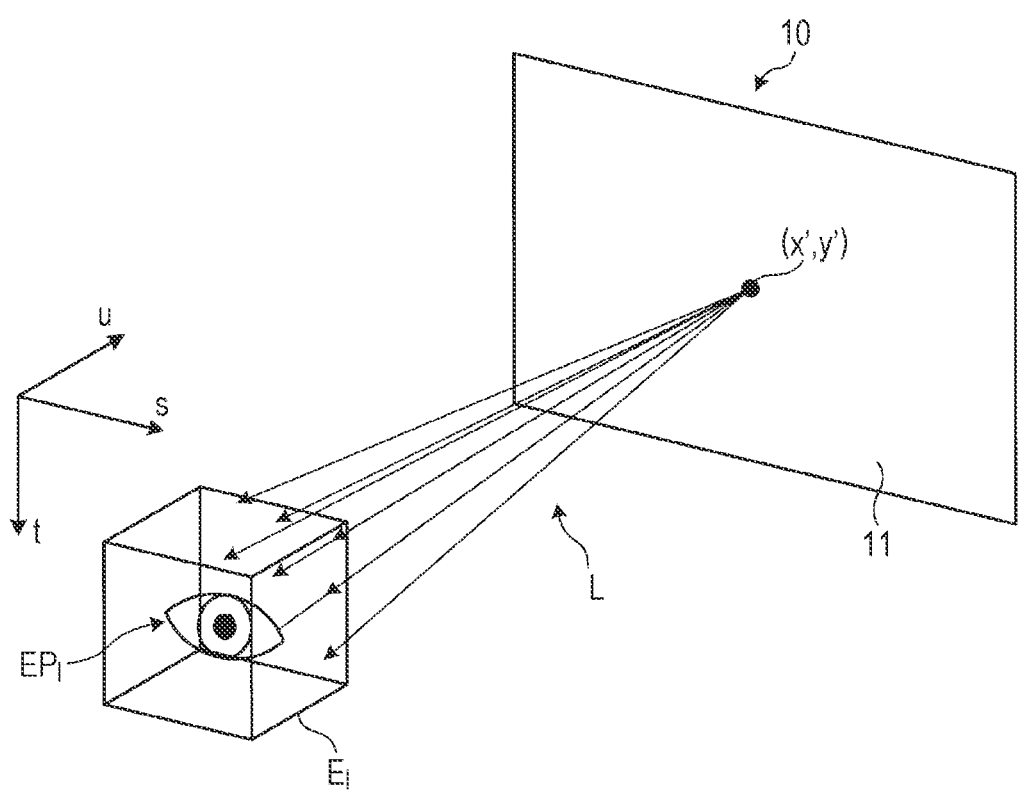
FIG. 4 is a diagram illustrating a relationship between a region that the information processing apparatus according to the embodiment has set by using a viewpoint position as a reference and a ray of light.

FIG. 4 is a diagram illustrating a relationship between a region that the information processing apparatus 30 according to the embodiment has set by using a viewpoint position as a reference and a ray of light. In FIG. 4, an stu coordinate system has an s-axis that indicates the horizontal direction, a t-axis that indicates the vertical direction, and a u-axis that indicates a depth. The depth means a direction toward the display device 10.

In the example illustrated in FIG. 4, the information processing apparatus 30 has set the region $E_l$ by using, as a reference, a viewpoint position $EP_l$ of the left eye of the observer 200. In this case, the information processing apparatus 30 causes a ray-of-light group L to be emitted toward the region $E_l$ from the point (x', y') in the xy coordinate system of the liquid crystal panel 11. The ray-of-light group L is a ray-of-light group that makes it possible to stereoscopically view a three-dimensional object from an inside of the region $E_l$. The ray-of-light group L includes a ray of light that passes through the inside of the region $E_l$.

Furthermore, the information processing apparatus 30 may or may not cause a ray of light to be emitted toward an outside of the region $E_l$ from the point (x', y') of the liquid crystal panel 11. For example, the information processing apparatus 30 may cause emission of a ray-of-light group that makes it impossible to stereoscopically view a three-dimensional object and indicates the same image. Note that in the example illustrated in FIG. 4, for simplification of description, the region E. and rays of light that correspond to the right eye of the observer 200 are omitted. However, the information processing apparatus 30 causes the display device 10 to emit a ray-of-light group toward the region $E_r$, similarly to the left eye.

In the example illustrated in FIG. 4, a case where the information processing apparatus 30 sets a cubic space as the region $E_l$ has been described, but this is not restrictive. For example, the information processing apparatus 30 may set, as a region, a roughly spherical space or a plane.

Figure 5:
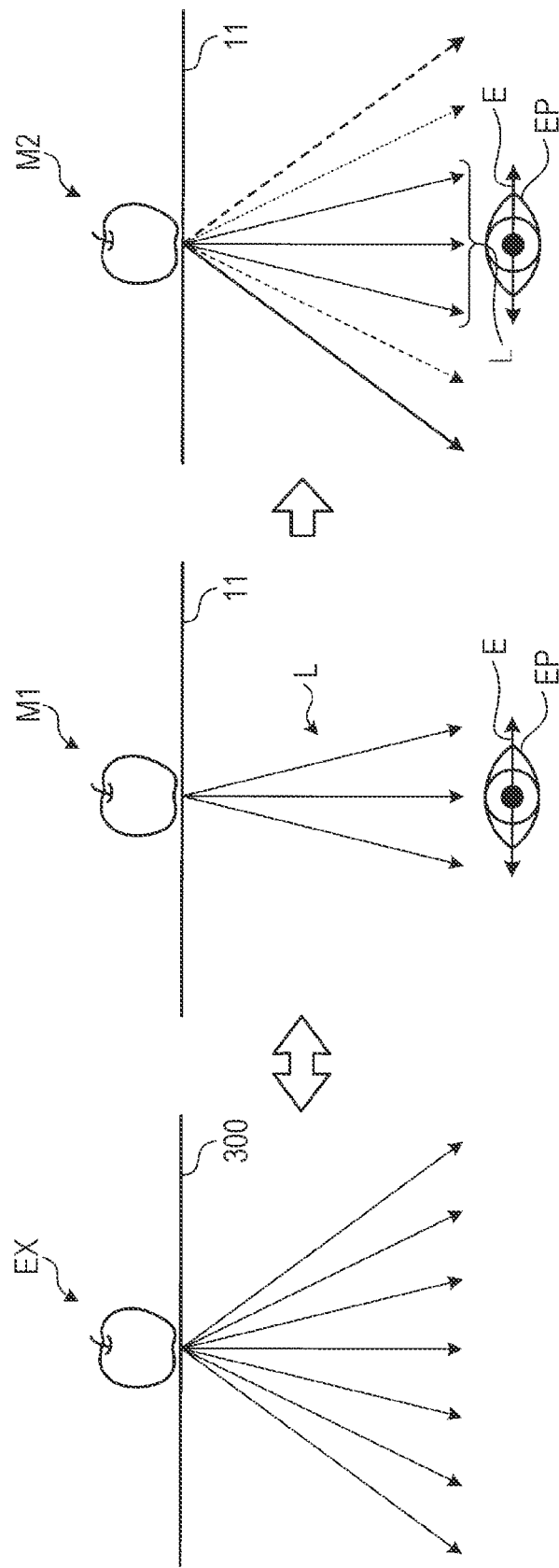
FIG. 5 is a diagram for explaining a ray-of-light group that the information processing apparatus according to the embodiment causes to be reproduced.

FIG. 5 is a diagram for explaining a ray-of-light group that the information processing apparatus 30 according to the embodiment causes to be reproduced. For example, in contrast to a parallax scheme for causing an object to be visually recognized as if the object popped up or were located in the back, the display device 10 of the light field scheme causes an object to be visually recognized as if the object existed inside the display device 10. In Reference Example Ex of FIG. 5, a light field regeneration device 300 emits a plurality of rays of light that has been sent out by a three-dimensional image indicating an apple. In order to widen a viewing angle in the horizontal direction of stereoscopic vision, it is requested that the light field regeneration device 300 cause a plurality of rays of light to be reproduced to be emitted to a wide range. For example, in order to emit 100 rays of light, it is requested that the display device 10 simultaneously display 100 images. Therefore, in order to regenerate rays of light in all of the three-dimensional directions, the light field regeneration device 300 needs a high resolution that enables videos in several hundred to several thousand viewpoints to be simultaneously displayed, or becomes a large-scale device.

The information processing apparatus 30 according to the embodiment limits a ray-of-light group L to be reproduced by the display device 10 to a peripheral region of a viewpoint position EP of the observer 200, as illustrated as Mode M1 of FIG. 5. By doing this, the information processing apparatus 30 can prevent a reduction in visibility due to a movement of the observer 200, and can also reduce the number of rays of light of the ray-of-light group L to be reproduced. Then, as illustrated as Mode M2 of FIG. 5, the display device 10 can be caused to only emit a ray-of-light group L for stereoscopic vision to the peripheral region of the viewpoint position EP of the observer 200, and emit rays of light that make it impossible to perform stereoscopic vision to a region that is different from the peripheral region.

[Relationship Between Ray of Light and Observer in Display Device According to Embodiment]

Figure 6:
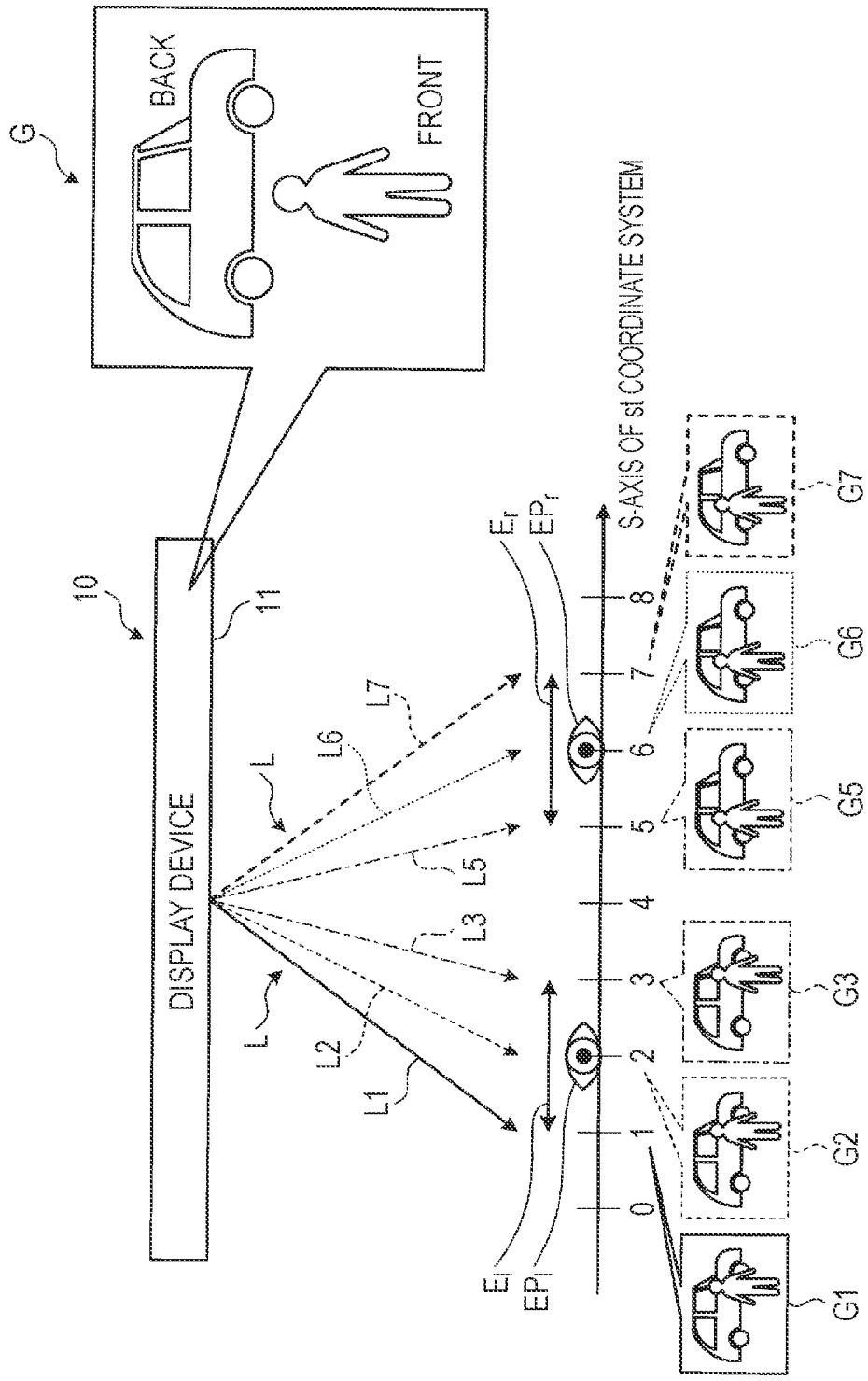
FIG. 6 is a diagram for explaining an example of a relationship among a ray of light, an image, and a viewpoint position in the information processing apparatus according to the embodiment.

FIG. 6 is a diagram for explaining an example of a relationship among a ray of light, an image, and a viewpoint position in the information processing apparatus 30 according to the embodiment. In the example illustrated in FIG. 6, the display device 10 displays an image G. The image G includes, for example, a moving image, a still image, or the like. The image G is an image that includes a vehicle that is located in the back, and a human that is located in front of the vehicle. The image G is an image for reproducing rays of light that have been sent out by the vehicle and the human. Then, in the observer 200 who observes the display device 10, a viewpoint position $EP_l$ of the left eye is located at the point (2, t) on the s-axis of the st coordinate system, and a viewpoint position $EP_r$ of the right eye is located at the point (6, t) on the s-axis of the st coordinate system. Note that in the example illustrated in FIG. 6, coordinates on the t-axis of the st coordinate system are fixed, for simplification of description.

The information processing apparatus 30 causes the specification unit 331 to specify the viewpoint positions $EP_l$ and $EP_r$ of the observer 200 on the basis of measurement information of the measurement device 20. The information processing apparatus 30 causes the setting unit 332 to set the regions $E_l$ and $E_r$ by using the respective viewpoint positions $EP_l$ and $EP_r$ as a reference. Specifically, the information processing apparatus 30 sets, as the region $E_l$, a range from the point (1, t) to the point (3, t) with the point (2, t) of the viewpoint position $EP_l$ of the left eye as a center (a reference). Then, the information processing apparatus 30 sets, as the region $E_r$, a range from the point (5, t) to the point (7, t) with the point (6, t) of the viewpoint position $EP_r$ of the right eye as a center. In this case, the information processing apparatus 30 performs control to cause the display device 10 to emit a ray-of-light group L that makes it possible to stereoscopically view the image G from an inside of the regions $E_l$ and $E_r$, and makes it impossible to stereoscopically view the image G from an outside of the regions $E_l$ and $E_r$.

For example, the display device 10 causes emission of a ray-of-light group L including rays of light L1, L2, and L3, and a ray-of-light group L including rays of light L5, L6, and L7. The ray of light L1 is a ray of light that indicates an image G1 in a case where the observer 200 performs visual recognition from the point (1, t). The ray of light L2 is a ray of light that indicates an image G2 in a case where the observer 200 performs visual recognition from the point (2, t). The ray of light L3 is a ray of light that indicates an image G3 in a case where the observer 200 performs visual recognition from the point (3, t). The ray of light L5 is a ray of light that indicates an image G5 in a case where the observer 200 performs visual recognition from the point (5, t). The ray of light L6 is a ray of light that indicates an image G6 in a case where the observer 200 performs visual recognition from the point (6, t). The ray of light L7 is a ray of light that indicates an image G7 in a case where the observer 200 performs visual recognition from the point (7, t). Note that the images G1, G2, G3, G5, G6, and G7 are respectively images different from each other in the cases of observation from viewpoints different from each other, and are respectively images indicated by different rays of light that have been sent out by the vehicle and the human.

In the example illustrated in FIG. 6, the observer 200 can stereoscopically view the vehicle and the human, by visually recognizing the image G2 by using the left eye and visually recognizing the image G6 by using the right eye. Then, in the observer 200, it is assumed, for example, that the viewpoint position $EP_l$ of the left eye has moved to the point (1, t), and the viewpoint position $EP_r$ of the right eye has moved to the point (5, t) on the s-axis of the st coordinate system. In this case, the observer 200 can stereoscopically view the vehicle and the human, by visually recognizing the image G1 by using the left eye and visually recognizing the image G5 by using the right eye. Then, in the observer 200, it is assumed, for example, that the viewpoint position $EP_l$ of the left eye has moved to the point (0, t), and the viewpoint position $EP_r$ of the right eye has moved to the point (4, t) on the s-axis of the st coordinate system. In this case, the viewpoint position $EP_l$ of the left eye has moved to an outside of the region $E_l$, and therefore the observer 200 fails to visually recognize a ray-of-light group in which rays of light indicating the image G have been reproduced. Furthermore, the viewpoint position $EP_r$ of the right eye has moved to an outside of the region $E_r$, and therefore the observer 200 fails to visually recognize a ray-of-light group in which rays of light indicating the image G have been reproduced. As a result, it becomes difficult for the observer 200 to stereoscopically view the image G of the display device 10.

Figure 7:
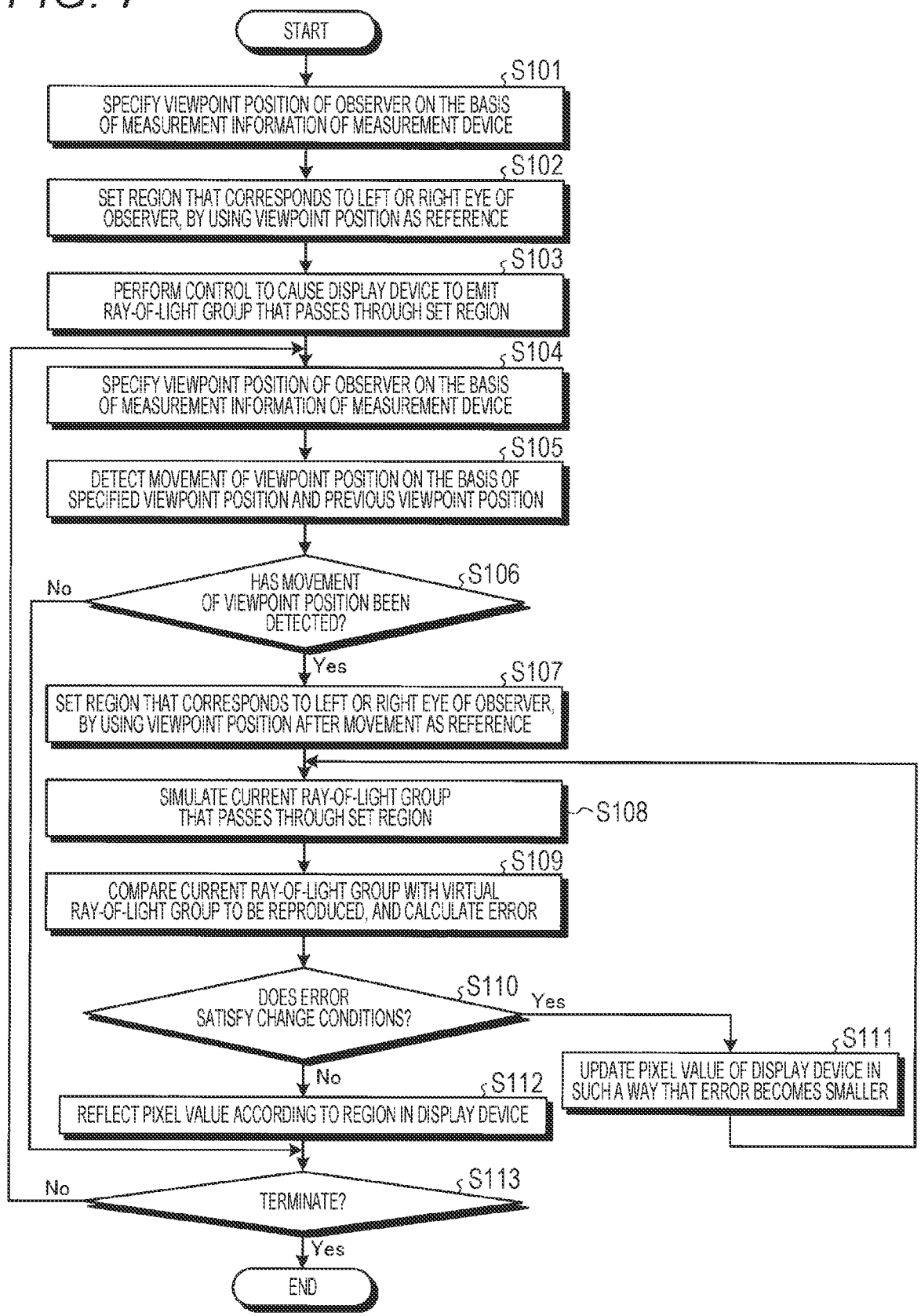
FIG. 7 is a flowchart illustrating an example of a processing procedure performed by the information processing apparatus according to the embodiment.

Next, an example of a processing procedure of the information processing apparatus 30 according to the embodiment is described with reference to FIG. 7. FIG. 7 is a flowchart illustrating an example of the processing procedure performed by the information processing apparatus 30 according to the embodiment. The processing procedure illustrated in FIG. 7 is implemented by the control unit 33 of the information processing apparatus 30 executing a program.

As illustrated in FIG. 7, the control unit 33 of the information processing apparatus 30 specifies viewpoint positions $EP_l$ and $EP_r$ of the observer 200 on the basis of measurement information of the measurement device 20 (step S101). For example, the control unit 33 acquires measurement information from the measurement device 20 via the communication unit 31, and specifies the viewpoint positions $EP_l$ and $EP_r$ of the observer 200 from the measurement information. The control unit 33 functions as the specification unit 331 by performing the process of step S101. When the process of step S101 has terminated, the processing of the control unit 33 moves on to step S102.

The control unit 33 sets regions $E_l$ and $E_r$ that correspond to the left and right eyes 201 of the observer 200, by using the viewpoint positions $EP_l$ and $EP_r$ as a reference (step S102). For example, the control unit 33 specifies the regions $E_l$ and $E_r$ that correspond to the left and right eyes 201, by using various known techniques, and stores region information indicating the regions $E_l$ and $E_r$ in the storage 32. The control unit 33 functions as the setting unit 332 by performing the process of step S102. When the process of step S102 has terminated, the processing of the control unit 33 moves on to step S103.

The control unit 33 performs control to cause the display device 10 to emit a ray-of-light group that passes through the set regions (step S103). For example, the control unit 33 determines a pixel value of the display device 10 for causing a ray-of-light group to be reproduced to be emitted, on the basis of image data 32A of the storage 32, and issues, to the display device 10, an instruction to conduct a display based on the pixel value. As a result, the display device 10 causes a ray-of-light group to be emitted on the basis of the pixel value indicated by the instruction. When the process of step S103 has terminated, the processing of the control unit 33 moves on to step S104.

The control unit 33 specifies viewpoint positions $EP_l$ and $EP_r$ of the observer 200 on the basis of measurement information of the measurement device 20 (step S104). Then, the control unit 33 detects a movement of viewpoint positions on the basis of the specified viewpoint positions $EP_l$ and $EP_r$ and previous viewpoint positions $EP_l$ and $EP_r$ (step S105). For example, in a case where it has been detected that a difference between the specified viewpoint positions $EP_l$ and $EP_r$ and the previous viewpoint positions $EP_l$ and $EP_r$ is an amount of movement of viewpoints that is greater than or equal to a threshold, the control unit 33 detects a movement of the viewpoint positions $EP_l$ and $EP_r$. For example, in a case where the specified viewpoint positions $EP_l$ and $EP_r$ are different from the previous viewpoint positions $EP_l$ and $EP_r$, and the specified viewpoint positions $EP_l$ and $EP_r$ are located close to an outside of the regions $E_l$ and $E_r$, the control unit 33 detects a movement of the viewpoint positions $EP_l$ and $EP_r$. The control unit 33 functions as the detection unit 334 by performing the process of step S105. The control unit 33 stores, in the storage 32, a detection result that includes whether or not a movement of viewpoint positions has been detected, viewpoint positions $EP_l$ and $EP_r$ for which a movement has been detected, or the like, and the processing moves on to step S106.

The control unit 33 determines whether or not a movement of the viewpoint positions $EP_l$ and $EP_r$ has been detected, on the basis of the detection result of step S105 (step S106). In a case where the control unit 33 has determined that a movement of the viewpoint positions $EP_l$ and $EP_r$ has not been detected (No in step S106), viewpoints of the observer 200 have not moved, and therefore the processing moves on to step S113 described later. Furthermore, in a case where the control unit 33 has determined that a movement of the viewpoint positions $EP_l$ and $EP_r$ has been detected (Yes in step S106), the processing moves on to step S107.

The control unit 33 sets regions $E_l$ and $E_r$ that correspond to the left and right eyes 201 of the observer 200, by using the viewpoint positions $EP_l$ and $EP_r$ after movement as a reference (step S107). The control unit 33 functions as the setting unit 332 by performing the process of step S107. When the process of step S107 has terminated, the processing of the control unit 33 moves on to step S108.

The control unit 33 simulates a current ray-of-light group that passes through the set regions (step S108). For example, the control unit 33 performs simulation in which transform is performed from a set P of pixel values at which the display device 10 has been caused to conduct a display or updated pixel values to a ray-of-light group, and a correspondence relationship between each ray of light and a pixel of the display device 10 is calculated. In the simulation, a correspondence relationship between each of the rays of light and a pixel of the display device 10 is calculated, for example, according to the method described above for reproducing a ray of light. When the control unit 33 has stored a result of simulation in the storage 32, the processing moves on to step S109.

The control unit 33 compares a current ray-of-light group with a virtual ray-of-light group to be reproduced, and calculates an error (step S109). For example, the control unit 33 calculates a virtual ray-of-light group to be reproduced that passes through the regions $E_l$ and $E_r$, on the basis of image data 32A of the storage 32. Then, the control unit 33 compares the current ray-of-light group that has been calculated in step S108 with the virtual ray-of-light group, and calculates an error. For example, the control unit 33 calculates a smaller error as a degree of matching between the current ray-of-light group and the virtual ray-of-light group increases, and the control unit 33 calculates a larger error as one latitude decreases. When the process of step S109 has terminated, the processing of the control unit 33 moves on to step S110.

The control unit 33 determines whether or not the error satisfies change conditions (step S110). The change conditions include, for example, conditions, such as a threshold or a range, for determining a change in a ray-of-light group. In a case where the control unit 33 has determined that the error satisfies the change conditions (Yes in step S110), the processing moves on to step S111. The control unit 33 updates a pixel value of the display device 10 in such a way that the error becomes smaller (step S111). For example, the control unit 33 determines a pixel value of the display device 10 for causing a ray-of-light group to be reproduced to be emitted, on the basis of the image data 32A of the storage 32, and performs updating. When the process of step S111 has terminated, the processing of the control unit 33 returns to step S108 that has already been described, and a processing procedure of step S108 and processes that follow is continued.

Furthermore, in a case where the control unit 33 has determined that the error does not satisfy the change conditions (No in step S110), the processing moves on to step S112. The control unit 33 reflects pixel values that correspond to the regions $E_l$ and $E_r$ in the display device 10 (step S112). For example, the control unit 33 issues, to the display device 10, an instruction to conduct a display based on the pixel value updated in step S111. As a result, the display device 10 causes a ray-of-light group based on the pixel value indicated by the instruction to be emitted toward the regions $E_l$ and $E_r$ after movement. Then, when the process of step S112 has terminated, the processing of the control unit 33 moves on to step S113.

The control unit 33 determines whether or not the processing will be terminated (step S113). For example, in a case where a power source of the display device 10 that has received a request of termination from the observer 200 or the like has been turned off, the control unit 33 determines that the processing will be terminated. In a case where the control unit 33 has terminated that the processing will not be terminated (No in step S113), the processing returns to step S104 that has already been described, and a processing procedure of step S104 and processes that follow is continued. Furthermore, in a case where the control unit 33 has determined that the processing will be terminated (Yes in step S113), the processing procedure illustrated in FIG. 7 is terminated.

In the processing procedure illustrated in FIG. 7, the control unit 33 functions as the display control unit 333 by performing the processes of step 3103 and step S108 to step S112.

[Operation of Display System According to Embodiment]

Figure 8:
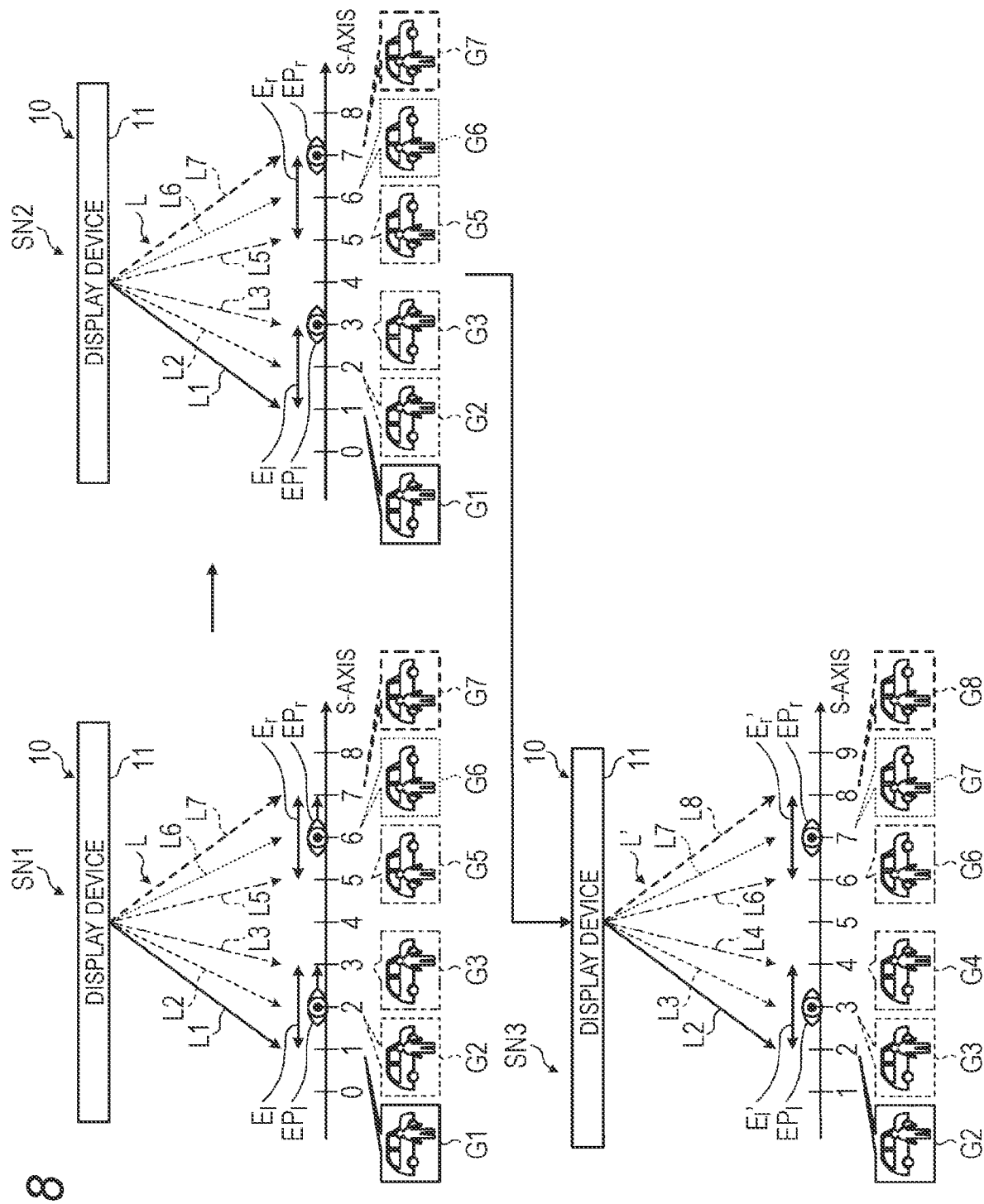
FIG. 8 is a diagram for explaining a relationship among a ray of light, an image, and a viewpoint position in the information processing apparatus according to the embodiment.

Next, an example of an operation of the display system 100 according to the embodiment is described with reference to FIG. 8. FIG. 8 is a diagram for explaining a relationship among a ray of light, an image, and a viewpoint position in the information processing apparatus 30 according to the embodiment. In the example illustrated in FIG. 8, the display device 10 displays the image G illustrated in FIG. 6, in Situation SN1 illustrated in FIG. 8, in the observer 200 who observes the display device 10, a viewpoint position $EP_l$ of the left eye is located at the point (2, t) on the s-axis of the st coordinate system, and a viewpoint position $EP_r$ of the right eye is located at the point (6, t) on the s-axis of the st coordinate system. Note that in the example illustrated in FIG. 8, coordinates on the t-axis of the st coordinate system are fixed, for simplification of description.

In Situation SN1, the information processing apparatus 30 causes the specification unit 331 to specify the viewpoint positions $EP_l$ and $EP_r$ of the observer 200 on the basis of measurement information of the measurement device 20. The information processing apparatus 30 causes the setting unit 332 to set the regions $E_l$ and $E_r$ by using the respective viewpoint positions $EP_l$ and $EP_r$ as a reference. Specifically, the information processing apparatus 30 sets, as the region $E_l$, a range from the point (1, t) to the point (3, t) with the point (2, t) of the viewpoint position $EP_l$ of the left eye as a center (a reference). Then, the information processing apparatus 30 sets, as the region $E_r$, a range from the point (5, t) to the point (7, t) with the point (6, t) of the viewpoint position $EP_r$ of the right eye as a center. In this case, the information processing apparatus 30 performs control to cause the display device 10 to emit a ray-of-light group L that makes it possible to stereoscopically view the image G from an inside of the regions $E_l$ and $E_r$, and makes it impossible to stereoscopically view the image G from an outside of the regions $E_l$ and $E_r$.

In Situation SN1, the observer 200 is stereoscopically viewing the vehicle and the human, by visually recognizing the image G2 by using the left eye and visually recognizing the image G6 by using the right eye. In this state, the observer 200 has moved the viewpoint position $EP_l$ of the left eye from the point (2, t) to the point (3, t), and has moved the viewpoint position $EP_r$ of the right eye from the point (6, t) to the point (7, t).

In Situation SN2, the observer 200 has moved the viewpoint position $EP_l$ of the left eye and the viewpoint position $EP_r$ of the right eye to the point (3, t) inside the region $E_l$ and the point (7, t) inside the region $E_r$, respectively. In this case, the observer 200 is stereoscopically viewing the vehicle and the human, by visually recognizing the image G3 that deviates from the point (2, t) by using the left eye and visually recognizing the image G7 that deviates from the point (6, t) by using the right eye.

In Situation SN2, the information processing apparatus 30 causes the specification unit 331 to specify that the viewpoint position $EP_l$ of the observer 200 is the point (3, t), and the viewpoint position $EP_r$ is the point (7, t), on the basis of measurement information of the measurement device 20. The information processing apparatus 30 causes the detection unit 334 to detect that the viewpoint position $EP_l$ of the left eye has moved from the point (2, t) to the point (3, t), and the viewpoint position $EP_r$ of the right eye has moved from the point (6, t) to the point (7, t). The information processing apparatus 30 causes the setting unit 332 to set regions $E_l'$ and $E_r'$ by using the respective viewpoint positions $EP_l$ and $EP_r$ as a reference. Specifically, the information processing apparatus 30 sets, as the region $E_l'$, a range from the point (2, t) to the point (4, t) with the point (3, t) of the viewpoint position $EP_l$ of the left eye as a center (a reference). Then, the information processing apparatus 30 sets, as the region $E_r'$, a range from the point (6, t) to the point (8, t) with the point (7, t) of the viewpoint position $EP_r$ of the right eye as a center. The information processing apparatus 30 compares a current ray-of-light group L with a virtual ray-of-light group to be reproduced, and calculates an error. The information processing apparatus 30 updates a pixel value of the display device 10 in such a way that the error becomes smaller.

In Situation SN3, the information processing apparatus 30 reflects the updated pixel value in the display device 10. Stated another way, the information processing apparatus 30 performs control to cause the display device 10 to emit a ray-of-light group L' that makes it possible to stereoscopically view the image G from an inside of the regions $E_l'$ and $E_r'$, and makes it impossible to stereoscopically view the image G from an outside of the regions $E_l'$ and $E_r'$. As a result, the display device 10 emits a ray-of-light group L' including rays of light L2, L3, and L4 of the images G2, G3, and G4, and a ray-of-light group L' including rays of light L6, L7, and L8 of the images G6, G7, and G8 toward the regions $E_l'$ and $E_r'$ that deviate from the regions $E_l$ and $E_r$.

In Situation SN3, the observer 200 is stereoscopically viewing the vehicle and the human, by visually recognizing the image G3 by using the left eye and visually recognizing the image G7 by using the right eye. As a result, the observer 200 can stereoscopically view the image G by using the ray-of-light groups L and L' of the display device 10, even if the viewpoint positions $EP_l$ and $EP_r$ have moved.

As described above, the information processing apparatus 30 according to the embodiment causes the specification unit 331 to specify a viewpoint position EP of the observer 200, and then causes the setting unit 332 to set a region E that makes it possible for the observer 200 to stereoscopically view a three-dimensional object, by using the viewpoint position EP as a reference. The information processing apparatus 30 causes the display control unit 333 to perform control to cause a display device to emit a ray-of-light group that makes it possible to stereoscopically view a three-dimensional object from an inside of the region E set by the setting unit 332, and makes it impossible to stereoscopically view the three-dimensional object from an outside of the region E. By doing this, it is sufficient if the information processing apparatus 30 causes the display device 10 to emit a ray-of-light group that makes it possible to stereoscopically view a three-dimensional object to the inside of the region E that has been set to correspond to the viewpoint position EP of the observer 200. As a result, a range in which rays of light of the three-dimensional object will be reproduced can be limited. Therefore, the information processing apparatus 30 can cause the observer 200 to visually recognize a stereoscopic image by using rays of light that have been emitted by the display device 10, even if a processing load relating to emission of rays of light is reduced. Furthermore, a region E that uses a viewpoint position of the observer 200 as a reference can be set. Even if the viewpoint position slightly deviates, the information processing apparatus 30 can cause the observer 200 to visually recognize a stereoscopic image, by setting the region E according to a movement of the head of the observer 200. Stated another way, the information processing apparatus 30 can provide the observer 200 with depth perception that is similar to depth perception in a case where rays of light are emitted omnidirectionally, by using a ray-of-light group that the display device 10 has emitted to a limited region E. Furthermore, the information processing apparatus 30 can achieve a reproduction range having a wide viewing area and a wide depth, even if a display device that can omnidirectionally emit rays of light is not used.

Furthermore, the information processing apparatus 30 calculates a pixel value for the display device 10 to emit a ray-of-light group L that passes through an inside of a region E toward the observer 200, and causes the display control unit 333 to control the display device 10 on the basis of the pixel value. By doing this, a pixel value of the display device 10 only for the region E is calculated, and therefore, the information processing apparatus 30 can control the display device 10 on the basis of the pixel value. As a result, in the information processing apparatus 30, a processing load of controlling the display device 10 is reduced, and this enables a reduction in a cost of a display system.

Furthermore, when the detection unit 334 has detected a movement of a viewpoint position EP of the observer 200, the information processing apparatus 30 causes the setting unit 332 to set a region E that uses, as a reference, a viewpoint position EP after movement. When the setting unit 332 has set the region E according to a movement of a viewpoint, the information processing apparatus 30 causes the display control unit 333 to perform control to cause a display device to emit a ray-of-light group L that makes it possible to stereoscopically view a three-dimensional object from an inside of the region E. By doing this, the information processing apparatus 30 resets the region E according to detection of a movement of the viewpoint position EP of the observer 200, and can cause the display device 10 to emit a ray-of-light group L to the region E after movement. As a result, the information processing apparatus 30 can adjust the region E according to a movement of the viewpoint position EP of the observer 200 to adjust a focus of the observer 200, and can maintain stereoscopic vision. Therefore, a reduction in visibility can be prevented.

Furthermore, when the detection unit 334 has detected a movement of the viewpoint position EP from an inside to an outside of the region E, the information processing apparatus 30 causes the setting unit 332 to set the region E by using the viewpoint position EP after movement as a reference. By doing this, when the viewpoint position EP of the observer 200 that is located inside the region E has moved toward an outside of the region E, the information processing apparatus 30 can reset the region E by using the viewpoint position EP after movement as a reference. As a result, even if the viewpoint position EP has moved to the outside of the region E, the information processing apparatus 30 can reset the region E, and can maintain stereoscopic vision performed by the observer 200. Therefore, a reduction in visibility can be prevented.

Furthermore, when the setting unit 332 has set the region E according to a movement of the viewpoint position EP, the information processing apparatus 30 compares a current ray-of-light group L that passes through the region E with a virtual ray-of-light group desired to reproduce a three-dimensional object, and reflects a result of comparison in a ray-of-light group L to be emitted from the display device 10. By doing this, when the region E has been reset, the information processing apparatus 30 can reflect a result of comparing the current ray-of-light group L with the virtual ray-of-light group in the ray-of-light group L to be emitted from the display device 10. As a result, it is sufficient if the information processing apparatus 30 controls the display device 10 on the basis of a result of comparing the current ray-of-light group L with the virtual ray-of-light group. This enables a reduction in a processing load relating to control of the ray-of-light group L to be emitted from the display device 10.

Furthermore, the information processing apparatus 30 calculates a current ray-of-light group L that passes through the region E from the display device 10. In a case where an error between the calculated current ray-of-light group L and a virtual ray-of-light group satisfies change conditions, a ray-of-light group L to be emitted from the display device 10 is changed in such a way that the error becomes smaller. By doing this, the information processing apparatus 30 can change the ray-of-light group L to be emitted from the display device 10 in accordance with the error between the current ray-of-light group L and the virtual ray-of-light group. As a result, it is sufficient if the information processing apparatus 30 controls the display device 10 in accordance with the error between the current ray-of-light group L and the virtual ray-of-light group. This enables a reduction in a processing load relating to control of the ray-of-light group L to be emitted from the display device 10.

The embodiment described above has described an example, and a variety of changes and applications can be made. For example, the information processing apparatus 30 according to the embodiment can set a variety of regions on the basis of a state of a movement of the viewpoint positions $EP_l$ and $EP_r$ of the observer 200, the number of observers 200, or the like.

[Variation (1) of Embodiment]

Figure 9:
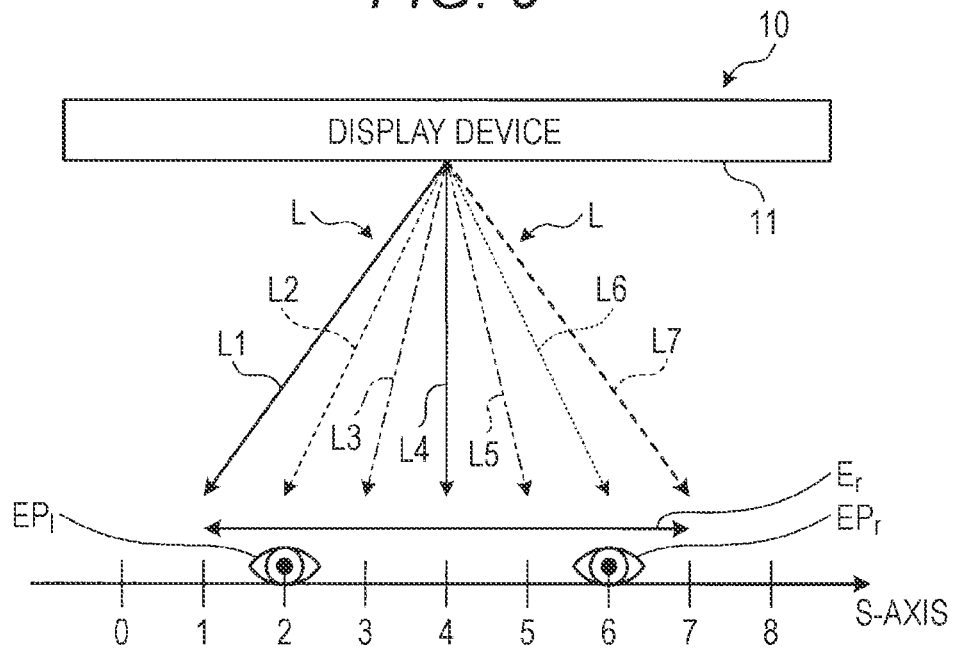
FIG. 9 is a diagram for explaining a relationship among a ray of light, a region, and a viewpoint position in an information processing apparatus in Variation (1) of the embodiment.

FIG. 9 is a diagram for explaining a relationship among a ray of light, a region, and a viewpoint position in an information processing apparatus 30 in Variation (1) of the embodiment. In the example illustrated in FIG. 9, the display device 10 displays the image G illustrated in FIG. 6, in the example illustrated in FIG. 9, in the observer 200 who observes the display device 10, a viewpoint position $EP_l$ of the left eye is located at the point (2, t) on the s-axis of the st coordinate system, and a viewpoint position $EP_r$ of the right eye is located at the point (6, t) on the s-axis of the st coordinate system. Note that in the example illustrated in FIG. 9, coordinates on the t-axis of the st coordinate system are fixed, for simplification of description.

The information processing apparatus 30 causes the specification unit 331 to specify the viewpoint positions $EP_l$ and $EP_r$ of the observer 200 on the basis of measurement information of the measurement device 20. The information processing apparatus 30 causes the setting unit 332 to set, as a region E, a range from the point (1, t) to the point (7, t) by using a center of the viewpoint positions $EP_l$ and $EP_r$ on the s-axis as a reference. Then, the information processing apparatus 30 causes the display control unit 333 to perform control to cause the display device 10 to emit a ray-of-light group L that makes it possible to stereoscopically view the image G from an inside of the region E, and makes it impossible to stereoscopically view the image G from an outside of the region E. By doing this, the display device 10 causes emission of a ray-of-light group L including rays of light L1, L2, L3, L4, L5, L6, and L7 toward the region E.

In the example illustrated in FIG. 9, the observer 200 can stereoscopically view the vehicle and the human, by visually recognizing the image G2 by using the left eye and visually recognizing the image G6 by using the right eye. Then, in the observer 200, it is assumed, for example, that the viewpoint position $EP_l$ of the left eye has moved to the point (1, t), and the viewpoint position $EP_r$ of the right eye has moved to the point (5, t) on the s-axis of the st coordinate system. In this case, the observer 200 can stereoscopically view the vehicle and the human, by visually recognizing the image G1 by using the left eye and visually recognizing the image G5 by using the right eye. Then, in the observer 200, it is assumed, for example, that the viewpoint position $EP_l$ of the left eye has moved to the point (0, t), and the viewpoint position $EP_r$ of the right eye has moved to the point (4, t) on the s-axis of the st coordinate system. In this case, the viewpoint position $EP_l$ of the left eye has moved to an outside of the region $E_l$, and therefore the observer 200 fails to visually recognize a ray-of-light group in which rays of light indicating the image G have been reproduced. Furthermore, the viewpoint position $EP_r$ of the right eye has moved to an outside of the region $E_r$, and therefore the observer 200 fails to visually recognize a ray-of-light group in which rays of light indicating the image G have been reproduced. As a result, it becomes difficult for the observer 200 to stereoscopically view the image G of the display device 10.

As described above, the information processing apparatus 30 according to the embodiment causes the setting unit 332 to set a single region E that includes viewpoint positions $EP_l$ and $EP_r$ of both eyes of the observer 200 that have been specified by the specification unit 331. By doing this, the information processing apparatus 30 can set a single region E by using the viewpoint positions $EP_l$ and $EP_r$ as a reference. As a result, a ray-of-light group L is reproduced in a single region, and therefore the information processing apparatus 30 can further reduce a processing load.

[Variation (2) of Embodiment]

Figure 10:
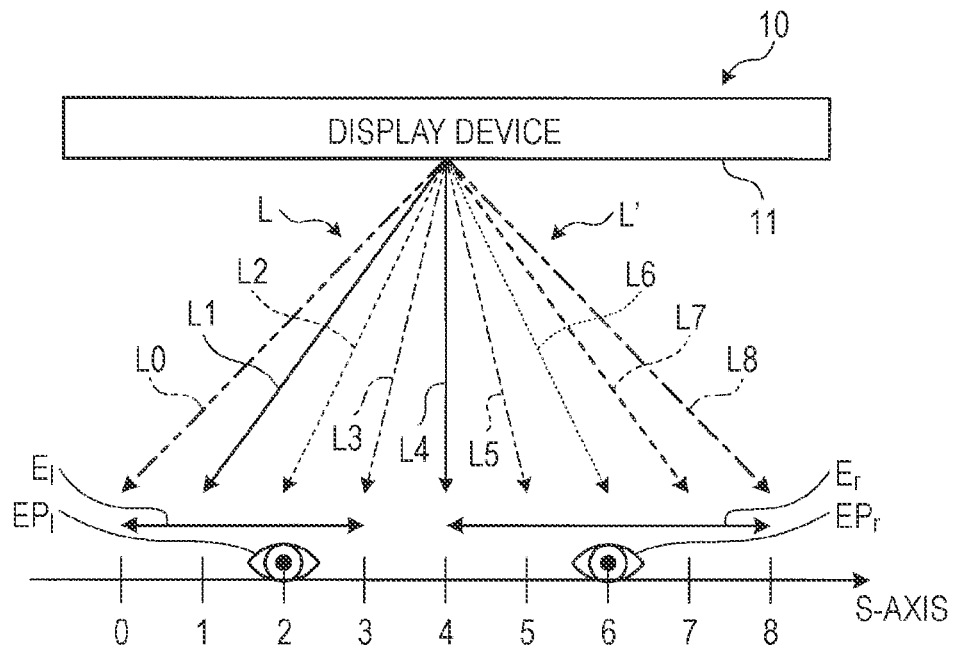
FIG. 10 is a diagram for explaining a relationship among a ray of light, a region, and a viewpoint position in an information processing apparatus in Variation (2) of the embodiment.

FIG. 10 is a diagram for explaining a relationship among a ray of light, a region, and a viewpoint position in an information processing apparatus 30 in Variation (2) of the embodiment. In the example illustrated in FIG. 10, the display device 10 displays the image G illustrated in FIG. 6, in the example illustrated in FIG. 10, in the observer 200 who observes the display device 10, a viewpoint position $EP_l$ of the left eye is located at the point (2, t) on the s-axis of the st coordinate system, and a viewpoint position $EP_r$ of the right eye is located at the point (6, t) on the s-axis of the st coordinate system. Note that in the example illustrated in FIG. 10, coordinates on the t-axis of the st coordinate system are fixed, for simplification of description.

In the example illustrated in FIG. 10, the observer 200 is directing the head toward a right-hand side in front of the display device 10. In this case, the measurement device 20 has output, to the information processing apparatus 30, measurement information indicating that the left eye of the observer 200 can be measured, but the right eye fails to be measured.

The specification unit 331 of the information processing apparatus 30 specifies that the viewpoint position $EP_l$ of the left eye of the observer 200 is the point (2, t), and estimates the viewpoint position $EP_r$ of the right eye on the basis of the point (2, t), and therefore the specification unit 331 specifies that the viewpoint position $EP_r$ is the point (6, t). In this case, the specification unit 331 associates a low precision of specification of the right eye with the viewpoint position $EP_r$, and outputs the viewpoint positions $EP_l$ and $EP_r$ of the observer 200 to the setting unit 332.

The setting unit 332 of the information processing apparatus 30 sets regions $E_l$ and $E_r$ that have sizes different from each other on the basis of the precisions of the viewpoint positions $EP_l$ and $EP_r$ that have been specified by the specification unit 331. For example, the setting unit 332 sets, as the region $E_l$, a range from the point (1, t) to the point (3, t) with the point (2, t) of the viewpoint position $EP_l$ of the left eye as a center (a reference). Then, the precision of specification of the viewpoint position $EP_r$ of the right eye is low, and therefore the setting unit 332 sets the region $E_r$ of the right eye to be wider than the region $E_l$ of the left eye. Specifically, the setting unit 332 sets, as the region $E_r$, a range from the point (4, t) to the point (8, t) with the point (6, t) of the viewpoint position $EP_r$ of the right eye as a center.

The display control unit 333 performs control to cause the display device 10 to emit a ray-of-light group L that makes it possible to stereoscopically view the image G from an inside of the regions $E_l$ and $E_r$, and makes it impossible to stereoscopically view the image G from an outside of the regions $E_l$ and $E_r$. Specifically, the display control unit 333 causes the display device 10 to emit a ray-of-light group L including rays of light L1, L2, and L3 to the region $E_l$, and emit a ray-of-light group L' including rays of light L4, L5, L6, L7, and L8 to the regions $E_l$ and $E_r$. As a result, the observer 200 can stereoscopically view the vehicle and the human, by visually recognizing any of the image G0 to the image G3 by using the left eye and visually recognizing any of the image G4 to the image G8 by using the right eye.

As described above, the information processing apparatus 30 according to the embodiment sets regions $E_l$ and $E_r$ that have sizes different from each other on the basis of the precisions of viewpoint positions $EP_l$ and $EP_r$ that have been specified by the specification unit 331. By doing this, the regions $E_l$ and $E_r$ that have sizes different from each other are set, and therefore the information processing apparatus 30 can cause the display device 10 to emit ray-of-light groups L and L' that are suitable for the regions $E_l$ and $E_r$. As a result, even if an orientation of the head of the observer 200 changes or moves, the information processing apparatus 30 can adjust a focus of the observer 200, and can maintain stereoscopic vision. Therefore, a reduction in visibility can be prevented.

Note that in a case where the specification precisions of both the viewpoint positions $EP_l$ and $EP_r$ of both eyes of the observer 200 are low, the information processing apparatus 30 in Variation (2) of the embodiment may set both the regions $E_l$ and $E_r$ to be wider than the regions $E_l$ and $E_r$ in a case where the specification institutions are high. Alternatively, the information processing apparatus 30 may set a single region that includes both the viewpoint positions $EP_l$ and $EP_r$.

[Variation (3) of Embodiment]

Figure 11:
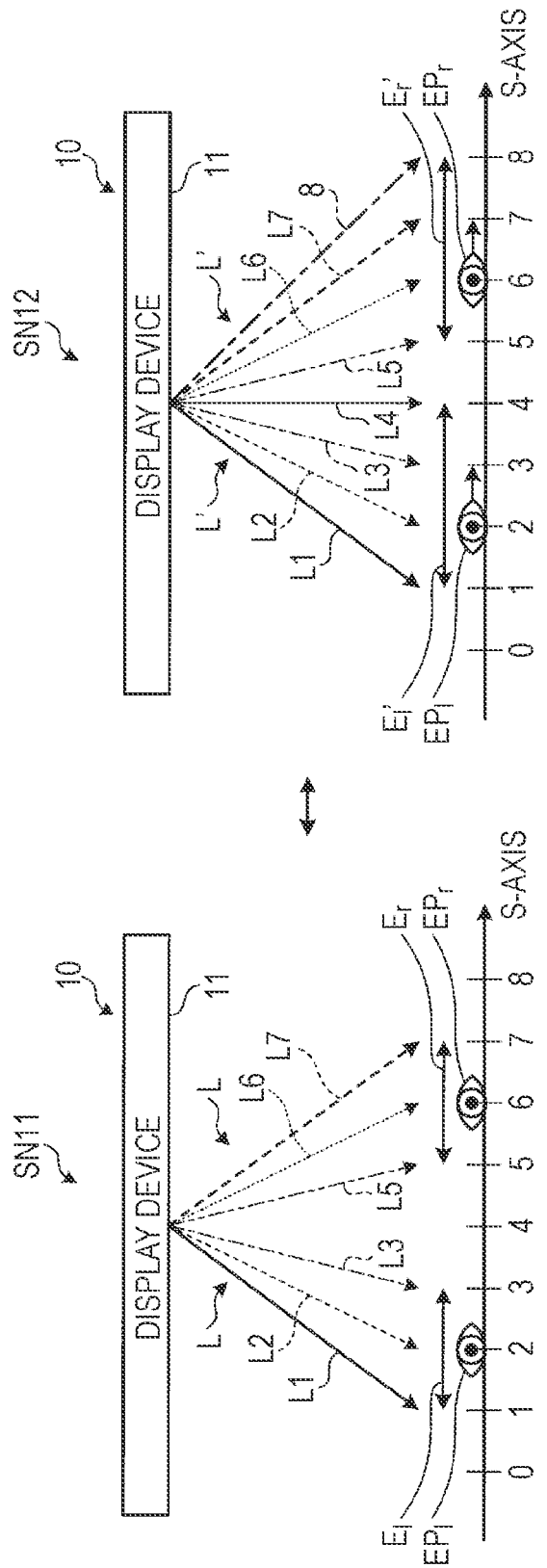
FIG. 11 is a diagram for explaining a relationship among a ray of light, a region, and a viewpoint position in an information processing apparatus in Variation (3) of the embodiment.

FIG. 11 is a diagram for explaining a relationship among a ray of light, a region, and a viewpoint position in an information processing apparatus 30 in Variation (3) of the embodiment. In the example illustrated in FIG. 11, the display device 10 displays the image G illustrated in FIG. 6, in Situation SN11 illustrated in FIG. 11, the observer 200 is observing the display device 10 in a stationary state. Stated another way, viewpoint positions $EP_l$ and $EP_r$ of the observer 200 are in a stationary state where a range of movement is small. In the observer 200, the viewpoint position $EP_l$ of the left eye is located at the point (2, t) on the s-axis of the st coordinate system, and the viewpoint position $EP_r$ of the right eye is located at the point (6, t) on the s-axis of the st coordinate system. Note that in the example illustrated in FIG. 11, coordinates on the t-axis of the st coordinate system are fixed, for simplification of description.

In Situation SN11, the information processing apparatus 30 causes the specification unit 331 to specify the viewpoint positions $EP_l$ and $EP_r$ of the observer 200 on the basis of measurement information of the measurement device 20. The information processing apparatus 30 causes the setting unit 332 to set the regions $E_l$ and $E_r$ in a state where the observer 200 is in the stationary state, by using the respective viewpoint positions $EP_l$ and $EP_r$ as a reference. Specifically, the information processing apparatus 30 sets, as the region $E_l$, a range from the point (1, t) to the point (3, t) with the point (2, t) of the viewpoint position $EP_l$ of the left eye as a center (a reference). Then, the information processing apparatus 30 sets, as the region $E_r$, a range from the point (5, t) to the point (7, t) with the point (6, t) of the viewpoint position $EP_r$ of the right eye as a center. In this case, the information processing apparatus 30 performs control to cause the display device 10 to emit a ray-of-light group L that makes it possible to stereoscopically view the image G from an inside of the regions $E_l$ and $E_r$, and makes it impossible to stereoscopically view the image G from an outside of the regions $E_l$ and $E_r$.

In Situation SN12, the observer 200 is observing the display device 10 in a moving state. Stated another way, the viewpoint positions $EP_l$ and $EP_r$ of the observer 200 are in a moving state where a range of movement is large. In the observer 200, the viewpoint position $EP_l$ of the left eye is moving in a rightward direction from the point (2, t) on the s-axis of the st coordinate system, and the viewpoint position $EP_r$ of the right eye is moving in the rightward direction from the point (6, t) on the s-axis of the st coordinate system.

In Situation SN12, the information processing apparatus 30 causes the specification unit 331 to specify the viewpoint positions $EP_l$ and $EP_r$ in the moving state of the observer 200 on the basis of measurement information of the measurement device 20. The information processing apparatus 30 causes the setting unit 332 to set regions $E_l'$ and $E_r'$ that extend in the rightward direction, by using the respective viewpoint positions $EP_l$ and $EP_r$ at the point in time of specification as a reference. Specifically, a direction of movement of the viewpoint positions $EP_l$ and $EP_r$ is the rightward direction, and therefore the information processing apparatus 30 sets, as the region $E_l'$, a range from the point (1, t) to the point (4, t) by using the point (2, t) of the viewpoint position $EP_l$ of the left eye a reference. Then, the information processing apparatus 30 sets, as the region $E_r'$, a range from the point (5, t) to the point (8, t) by using the point (6, t) of the viewpoint position $EP_r$ of the right eye as a reference. Stated another way, the information processing apparatus 30 sets regions $E_l'$ and $E_r'$ that have ranges that are wider than the regions $E_l$ and $E_r$ in the stationary state, and have shapes that correspond to a direction of movement. In a case where the viewpoint positions $EP_l$ and $EP_r$ are moving, the information processing apparatus 30 sets regions $E_l'$ and $E_r'$ that are wide in the direction of movement and are narrow in a direction opposite to the direction of movement. In this case, the information processing apparatus 30 performs control to cause the display device 10 to emit a ray-of-light group L' that makes it possible to stereoscopically view the image G from an inside of the regions $E_l'$ and $E_r'$, and makes it impossible to stereoscopically view the image G from an outside of the regions $E_l'$ and $E_r'$.

Thereafter, when the viewpoint positions $EP_l$ and $EP_r$ of the observer 200 has become stationary, the information processing apparatus 30 causes the setting unit 332 to set regions $E_l$ and $E_r$ in a state where the observer 200 is in a stationary state, by using the respective viewpoint positions $EP_l$ and $EP_r$ in the stationary state as a reference, similarly to Situation SN11.

As described above, in a case where the detection unit 334 has detected a movement of the viewpoint positions $EP_l$ and $EP_r$, the information processing apparatus 30 according to the embodiment causes the setting unit 332 to set regions $E_l'$ and $E_r'$ that are larger than regions $E_l'$ and $E_r'$ in a case where the viewpoint positions $EP_l$ and $EP_r$ are stationary. By doing this, the information processing apparatus 30 sets regions $E_l'$ and $E_r'$ that correspond to a state of movement of the viewpoint positions $EP_l$ and $EP_r$, and can cause the display device 10 to emit a ray-of-light group L' that is suitable for the regions $E_l'$ and $E_r'$. As a result, the information processing apparatus 30 can avoid a situation where stereoscopic vision fails to be performed due to deviation of the viewpoint positions $EP_l$ and $EP_r$ from the regions $E_l'$ and $E_r'$ during movement. Therefore, a reduction in visibility can be prevented.

The information processing apparatus 30 in Variation (3) of the embodiment may change sizes, shapes, or the like of regions $E_l$ and $E_r$ to be set in accordance with the speed of movement of the viewpoint positions $EP_l$ and $EP_r$. Furthermore, the information processing apparatus 30 may estimate the speed of movement of the viewpoint positions $EP_l$ and $EP_r$. In a case where the speed of movement is high, the information processing apparatus 30 may optimize the region E by lightly weighting a wide range, and may set the region E. In a case where the speed of movement of the viewpoint positions $EP_l$ and $EP_r$ is low, the information processing apparatus 30 may optimize the region E by weighting, at a medium level, a range that is narrower than a range in the case of a high speed of movement. In a case where the viewpoint positions $EP_l$ and $EP_r$ are stationary, the information processing apparatus 30 may optimize the region E by heavily weighting a narrower range.

[Variation (4) of Embodiment]

A case where an information processing apparatus 30 in Variation (4) of the embodiment reproduces a ray-of-light group for a plurality of observers 200 is described.

Figure 12:
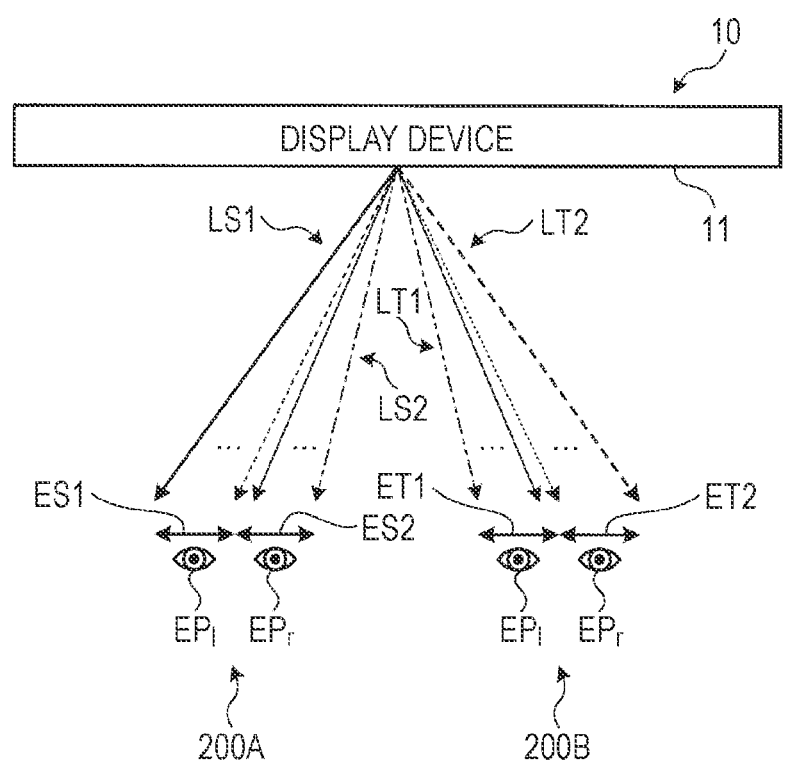
FIG. 12 is a diagram for explaining a relationship among a ray of light, an image, and a viewpoint position in an information processing apparatus in Variation (4) of the embodiment.

FIG. 12 is a diagram for explaining a relationship among a ray of light, an image, and a viewpoint position in the information processing apparatus 30 in Variation (4) of the embodiment. In the example illustrated in FIG. 12, the display device 10 displays the image G illustrated in FIG. 6, in the example illustrated in FIG. 12, two observers 200 who line up in an s-axis direction of the st coordinate system are observing the display device 10.

The detection unit 334 of the information processing apparatus 30 detects viewpoint positions $EP_l$ and $EP_r$ of each of the two observers 200A and 200B on the basis of measurement information of the measurement device 20. The setting unit 332 of the information processing apparatus 30 sets four regions ES1, ES2, ET1, and ET2 that respectively correspond to a plurality of observers 200. The regions ES1 and ES2 respectively correspond to the viewpoint positions $EP_l$ and $EP_r$ of the observer 200A. The regions ET1 and ET2 respectively correspond the viewpoint positions $EP_l$ and $EP_r$ of the observer 200A. The display control unit 333 of the information processing apparatus 30 performs control to cause the display device 10 to emit ray-of-light groups LS1, LS2, LT1, and LT2 that make it possible to stereoscopically view a three-dimensional object from an inside of the four regions ES1, ES2, ET1, and ET2 set by the setting unit 332, and make it impossible to stereoscopically view the three-dimensional object from an outside of the four regions ES1, ES2, ET1, and ET2. As a result, the observer 200A can stereoscopically view the vehicle and the human by visually recognizing the ray-of-light groups LS1 and LS2. The observer 200B can stereoscopically view the vehicle and the human by visually recognizing the ray-of-light groups LT1 and LT2.

As described above, when the detection unit 334 has detected viewpoint positions $EP_l$ and $EP_r$ of a plurality of observers 200A and 200B, the information processing apparatus 30 in Variation (4) of the embodiment causes the setting unit 332 to set four regions ES1, ES2, ET1, and ET2 that respectively correspond to a plurality of observers 200. The information processing apparatus 30 performs control to cause the display device 10 to emit ray-of-light groups LS1, LS2, LT1, and LT2 that correspond to the four regions ES1, ES2, ET1, and ET2. By doing this, when the plurality of observers 200A and 200B is observing the display device 10, the information processing apparatus 30 can cause emission of the ray-of-light groups LS1, LS2, LT1, and LT2 that are suitable for the four regions ES1, ES2, ET1, and ET2 of the observers 200A and 200B. As a result, the information processing apparatus 30 can limit a range in which rays of light of a three-dimensional object will be reproduced. This enables a reduction in a processing load relating to emission of rays of light in comparison with the case of omnidirectionally emitting rays of light. Furthermore, the information processing apparatus 30 can provide the plurality of observers 200A and 200B with depth perception that is similar to depth perception in a case where rays of light are emitted omnidirectionally.

Note that a case where the information processing apparatus 30 in Variation (4) of the embodiment sets four regions ES1, ES2, ET1, and ET2 for a plurality of observers 200A and 200B has been described, but this is not restrictive. For example, the information processing apparatus 30 may set a single region for each of the plurality of observers 200A and 200B, or may set a single region that corresponds to both the plurality of observers 200A and 200B.

Note that Variation (1) to Variation (4) of the embodiment may be applied to an information processing apparatus 30 in another variation, or may be combined.

[Hardware Configuration]

Figure 13:
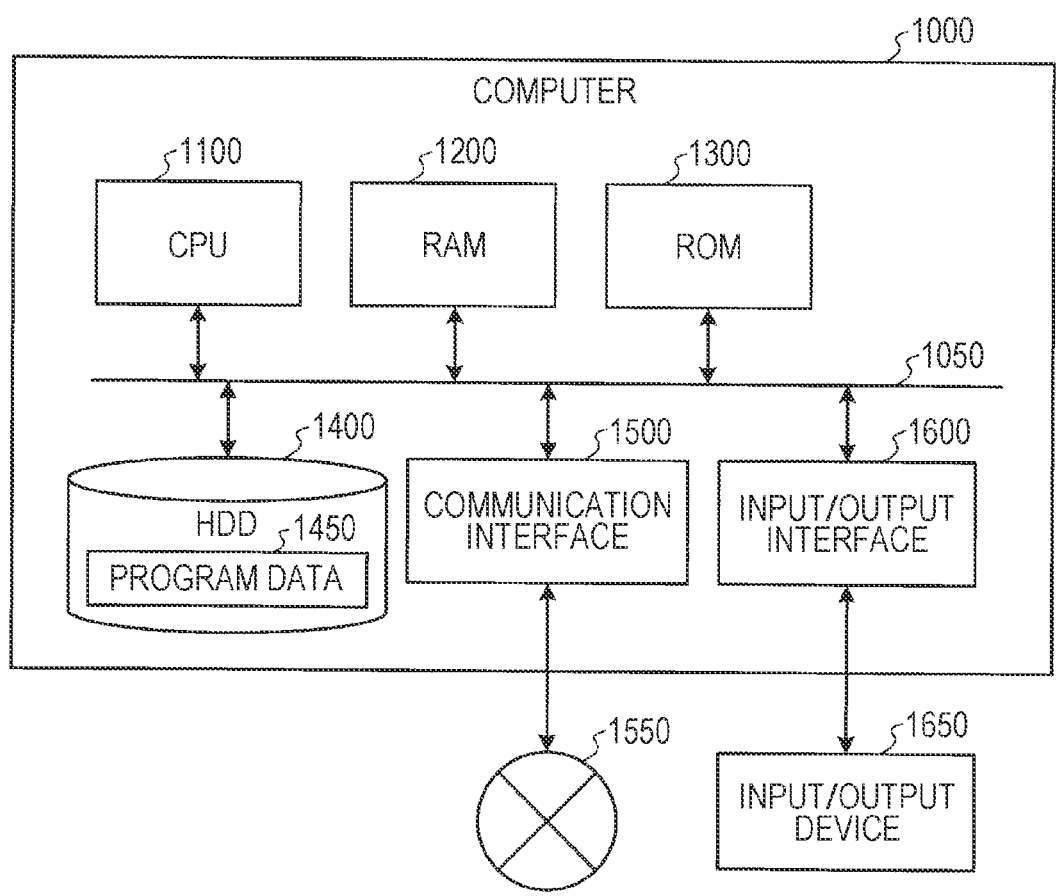
FIG. 13 is a hardware configuration diagram illustrating an example of a computer that achieves functions of an information processing apparatus.

The information processing apparatuses 30 according to the first to fourth embodiments described above may be implemented, for example, by a computer 1000 having a configuration illustrated in FIG. 13. Description is provided below by using the information processing apparatus 30 according to the embodiment as an example. FIG. 13 is a hardware configuration diagram illustrating an example of a computer 1000 that achieves functions of the information processing apparatus 30. The computer 1000 includes, a CPU 1100, a RAM 1200, a read only memory (ROM) 1300, a hard disk drive (HDD) 1400, a communication interface 1500, and an input/output interface 1600. Respective units of the computer 1000 are connected by a bus 1050.

The CPU 1100 operates on the basis of a program stored in the ROM 1300 or the HDD 1400, and controls respective units. For example, the CPU 1100 develops the program stored in the ROM 1300 or the HDD 1400 in the RAM 1200, and performs processing that corresponds to each type of program.

The ROM 1300 stores a boot program, such as a basic input output system (BIOS), that is executed by the CPU 1100 at the time of activating the computer 1000, a program that depends on hardware of the computer 1000, or the like.

The HDD 1400 is a computer-readable recording medium that non-transitorily records a program executed by the CPU 1100, data that is used by the program, and the like. Specifically, the HDD 1400 is a recording medium that records an information processing program according to the present disclosure that serves as an example of a program data 1450.

The communication interface 1500 is an interface for the computer 1000 to be connected to an external network 1550 (for example, the Internet). For example, the CPU 1100 receives data from another device or transmits data generated by the CPU 1100 to another device via the communication interface 1500.

The input/output interface 1600 is an interface for connecting an input/output device 1650 and the computer 1000. For example, the CPU 1100 receives data from an input device such as a keyboard or a mouse via the input/output interface 1600. Furthermore, the CPU 1100 transmits data to an output device such as a display, a speaker, or a printer via the input/output interface 1600. Furthermore, the input/output interface 1600 may function as a medium interface that reads a program or the like that has been recorded in a predetermined recording medium (a medium). The medium is, for example, an optical recording medium such as a digital versatile disc (DVD), a magneto-optical recording medium such as a magneto-optical disk (MO), a tape medium, a magnetic recording medium, a semiconductor memory, or the like.

For example, in a case where the computer 1000 functions as the information processing apparatus 30 according to the embodiment, the CPU 1100 of the computer 1000 achieves functions of the specification unit 331, the setting unit 332, the display control unit 333, the detection unit 334, and the like by executing a program loaded into the RAM 1200. Furthermore, a program according to the present disclosure or data in the storage 32 is stored in the HDD 1400. Note that the CPU 1100 reads the program data 1450 from the HDD 1400, and executes the program data 1450. However, in another example, these programs may be acquired from another device via the external network 1550.

A preferred embodiment of the present disclosure has been described in detail above with reference to the attached drawings, but the technical scope of the present disclosure is not limited to the examples described above. It is obvious that a person with ordinary skill in the art to which the present disclosure pertains could conceive a variety of variations or modifications without departing from a technical idea described in the claims, and it should be understood that the variations or modifications fall under the technical scope of the present disclosure.

Furthermore, effects described herein are only exemplary or illustrative, and are not restrictive. Stated another way, a technology according to the present disclosure can exhibit other effects that would be obvious to those skilled in the art from the description provided herein in addition to the effects described above or instead of the effects described above.

Furthermore, a program for causing hardware, such as a CPU, a ROM, or a RAM, that is incorporated into a computer to achieve functions that are similar to a configuration that the information processing apparatus 30 has can also be generated, and a computer-readable recording medium that records the program can also be provided.

Furthermore, respective steps in processing performed by the information processing apparatus 30 herein do not always need to be performed in time series in the order described in a flowchart. For example, the respective steps in the processing performed by the information processing apparatus 30 may be performed in an order that is different from the order described in the flowchart, or may be performed in parallel.

Furthermore, the information processing apparatus 30 of the present embodiment can cause an observer 200 to perceive depth feeling of the display device 10, but this is not restrictive. For example, the information processing apparatus 30 can reproduce a light field around a viewpoint of an observer 200, and therefore the information processing apparatus 30 can also be used to correct eyesight of the observer 200. In this case, the information processing apparatus 30 has stored eyesight information relating to eyesight of the observer 200 in the storage 32 or the like, and the display control unit 333 controls the display device 10 to emit a ray-of-light group corrected on the basis of the eyesight information to the regions described above. A target for eyesight correction includes, for example, short-sightedness, far-sightedness, astigmatism, or the like.

Furthermore, in the present embodiment, a case where the information processing apparatus 30 is provided outside the display device 10 has been described, but this is not restrictive. For example, the information processing apparatus 30 may be incorporated into the display device 10 or the measurement device 20. For example, the information processing apparatus 30 may be implemented by an information processing server or the like that is communicable with the display device 10.

Furthermore, the information processing apparatus 30 according to the present embodiment can be used, for example, in a head-mounted display (HMD). For example, the information processing apparatus 30 can achieve an HMD that can adjust a focus, by using the display device 10 in a display panel of the HMD and being combined with line-of-sight tracking (eye tracking).

(Effects)

An information processing apparatus 30 includes: a specification unit 331 that specifies a viewpoint position of an observer of a display device that reproduces rays of light that have been sent out by a three-dimensional object; a setting unit 332 that sets a region E that makes it possible for an observer 200 to stereoscopically view the three-dimensional object, by using, as a reference, the viewpoint position that has been specified by the specification unit 331; and a display control unit 333 that performs control to cause a display device 10 to emit a ray-of-light group L that makes it possible to stereoscopically view the three-dimensional object from an inside of the region E that has been set by the setting unit 332, and makes it impossible to stereoscopically view the three-dimensional object from an outside of the region.

By doing this, it is sufficient if the information processing apparatus 30 causes the display device 10 to emit a ray-of-light group that makes it possible to stereoscopically view a three-dimensional object to the inside of the region E that has been set to correspond to a viewpoint position EP of the observer 200. As a result, a range in which rays of light of the three-dimensional object will be reproduced can be limited. Therefore, the information processing apparatus 30 can cause the observer 200 to visually recognize a stereoscopic image by using rays of light that have been emitted by the display device 10, even if a processing load relating to emission of rays of light is reduced. Furthermore, a region E that uses a viewpoint position of the observer 200 as a reference can be set. Even if the viewpoint position slightly deviates, the information processing apparatus 30 can cause the observer 200 to visually recognize a stereoscopic image, by setting the region E according to a movement of the head of the observer 200. Stated another way, the information processing apparatus 30 can provide the observer 200 with depth perception that is similar to depth perception in a case where rays of light are emitted omnidirectionally, by using a ray-of-light group that the display device 10 has emitted to a limited region E. Furthermore, the information processing apparatus 30 can achieve a reproduction range having a wide viewing area and a wide depth, even if a display device that can omnidirectionally emit rays of light is not used.

In the information processing apparatus 30, the display control unit 333 calculates a pixel value for the display device 10 to emit a ray-of-light group L that passes through the inside of the region E toward the observer 200, and controls the display device 10 on the basis of the pixel value.

By doing this, a pixel value of the display device 10 only for the region E is calculated, and therefore, the information processing apparatus 30 can control the display device 10 on the basis of the pixel value. As a result, in the information processing apparatus 30, a processing load of controlling the display device 10 is reduced, and this enables a reduction in a cost of a display system 100.

The information processing apparatus 30 further includes a detection unit 334 that detects a movement of the viewpoint position of the observer 200. When the detection unit 334 has detected the movement of the viewpoint position, the setting unit 332 sets the region E by using the viewpoint position after movement as a reference. When the region E according to a movement of a viewpoint has been set by the setting unit 332, the display control unit 333 performs control to cause the display device 10 to emit the ray-of-light group L that makes it possible to stereoscopically view the three-dimensional object from the inside of the region E.

By doing this, the information processing apparatus 30 resets the region E according to detection of the movement of the viewpoint position of the observer 200, and can cause the display device 10 to emit the ray-of-light group L to the region E after movement. As a result, the information processing apparatus 30 can adjust the region E according to a movement of the viewpoint position of the observer 200 to adjust a focus of the observer 200, and can maintain stereoscopic vision. Therefore, a reduction in visibility can be prevented.

In the information processing apparatus 30, when the detection unit 334 has detected a movement of the viewpoint position from the inside to the outside of the region E, the setting unit 332 sets the region E by using a viewpoint position after movement as a reference.

By doing this, when the viewpoint position of the observer 200 that is located inside the region E has moved toward the outside of the region E, the information processing apparatus 30 can reset the region E by using the viewpoint position EP after movement as a reference. As a result, even if the viewpoint position has moved to the outside of the region E, the information processing apparatus 30 can reset the region E, and can maintain stereoscopic vision performed by the observer 200. Therefore, a reduction in visibility can be prevented.

In the information processing apparatus 30, when the region E according to a movement of the viewpoint position has been set by the setting unit 332, the display control unit 333 compares a current ray-of-light group L that passes through the region E with a virtual ray-of-light group desired to reproduce the three-dimensional object, and reflects a result of comparison in a ray-of-light group L to be emitted from the display device 10.

By doing this, when the region E has been reset, the information processing apparatus 30 can reflect a result of comparing the current ray-of-light group L with the virtual ray-of-light group in the ray-of-light group L to be emitted from the display device 10. As a result, it is sufficient if the information processing apparatus 30 controls the display device 10 on the basis of a result of comparing the current ray-of-light group L with the virtual ray-of-light group. This enables a reduction in a processing load relating to control of the ray-of-light group L to be emitted from the display device 10.

In the information processing apparatus 30, the display control unit 333 calculates a current ray-of-light group L that passes through the region E from the display device 10. In a case where an error between the calculated current ray-of-light group L and the virtual ray-of-light group satisfies change conditions, a ray-of-light group L to be emitted from the display device 10 is changed in such a way that the error becomes smaller.

By doing this, the information processing apparatus 30 can change the ray-of-light group L to be emitted from the display device 10 in accordance with the error between the current ray-of-light group L and the virtual ray-of-light group. As a result, it is sufficient if the information processing apparatus 30 controls the display device 10 in accordance with the error between the current ray-of-light group L and the virtual ray-of-light group. This enables a reduction in a processing load relating to control of the ray-of-light group L to be emitted from the display device 10.

In the information processing apparatus 30, the setting unit 332 sets a single region E that includes viewpoint positions of both eyes of the observer 200 that have been specified by the specification unit 331.

By doing this, the information processing apparatus 30 can set a single region E by using the viewpoint positions of both observers 200 as a reference. As a result, a ray-of-light group L is reproduced in a single region, and therefore the information processing apparatus 30 can further reduce a processing load.

In the information processing apparatus 30, the setting unit 332 sets regions E that have sizes different from each other on the basis of precisions of the viewpoint positions that have been specified by the specification unit 331.

By doing this, the information processing apparatus 30 enables the display device 10 to emit ray-of-light groups L that are suitable for the regions E, by setting the regions E that have sizes different from each other. As a result, even if an orientation of the head of the observer 200 changes or moves, the information processing apparatus 30 can adjust a focus of the observer 200, and can maintain stereoscopic vision. Therefore, a reduction in visibility can be prevented.

In the information processing apparatus 30, in a case where a movement of the viewpoint positions has been detected by the detection unit 334, the setting unit 332 sets a region E that is larger than a region E in a case where the viewpoint positions are stationary.

By doing this, the information processing apparatus 30 sets a region E according to a state of movement of the viewpoint positions of the observer 200, and can cause the display device 10 to emit a ray-of-light group L that is suitable for the region E. As a result, the information processing apparatus 30 can avoid a situation where stereoscopic vision fails to be performed due to deviation of the viewpoint positions from the region E during movement, and a reduction in visibility can be prevented.

In the information processing apparatus 30, the detection unit 334 detects viewpoint positions of a plurality of observers 200, the setting unit 332 sets a plurality of regions E that respectively correspond to the plurality of observers 200, and the display control unit 333 performs control to cause a display device to emit a ray-of-light group L that makes it possible to stereoscopically view a three-dimensional object from an inside of the plurality of regions E that has been set by the setting unit 332, and makes it impossible to stereoscopically view the three-dimensional object from an outside of the plurality of regions E.

By doing this, when the plurality of observers 200 is observing the display device 10, the information processing apparatus 30 can cause emission of a ray-of-light group L that is suitable for the plurality of regions E of the plurality of observers 200. As a result, the information processing apparatus 30 can limit a range in which rays of light of a three-dimensional object will be reproduced. This enables a reduction in a processing load relating to emission of rays of light in comparison with the case of omnidirectionally emitting rays of light. Furthermore, the information processing apparatus 30 can provide the plurality of observers 200 with depth perception that is similar to depth perception in a case where rays of light are emitted omnidirectionally.

An information processing method of an information processing apparatus 30 is an information processing method performed by an information processing apparatus 30 that controls a display device 10 that reproduces rays of light that have been sent out by a three-dimensional object, and the information processing method includes: a step of specifying a viewpoint position of an observer 200 of the display device 10; a step of setting a region E that makes it possible for the observer 200 to stereoscopically view the three-dimensional object, by using, as a reference, the viewpoint position that has been specified; and a step of performing control to cause the display device 10 to emit a ray-of-light group L that makes it possible to stereoscopically view the three-dimensional object from an inside of the region E that has been set, and makes it impossible to stereoscopically view the three-dimensional object from an outside of the region E.

By doing this, in the information processing method, it is sufficient if the information processing apparatus 30 causes the display device 10 to emit a crossing-line group that makes it possible to stereoscopically view the three-dimensional object to the inside of the region E that has been set to correspond to a viewpoint position EP of the observer 200. As a result, in the information processing method, a range in which rays of light of a three-dimensional object will be reproduced can be limited. Therefore, even if a processing load relating to emission of rays of light is reduced, the observer 200 is enabled to visually recognize a stereoscopic image by using rays of light that have been emitted by the display device 10. Furthermore, in the information processing method, a region E that uses a viewpoint position of the observer 200 as a reference can be set. Even if the viewpoint position slightly deviates, the observer 200 is enabled to visually recognize a stereoscopic image, by setting a region E according to a movement of the head of the observer 200. Stated another way, in the information processing method, depth perception that is similar to depth perception in a case where rays of light are emitted omnidirectionally can be provided to the observer 200, by using a ray-of-light group that the display device 10 has emitted to the limited region E. Furthermore, in the information processing method, a reproduction range having a wide viewing area and a wide depth can be achieved, even if a display device that can omnidirectionally emit rays of light is not used.

A program causes an information processing apparatus 30 that controls a display device 10 that reproduces rays of light that have been sent out by a three-dimensional object to perform: a step of specifying a viewpoint position of an observer 200 of the display device 10; a step of setting a region E that makes it possible for the observer 200 to stereoscopically view the three-dimensional object, by using, as a reference, the viewpoint position that has been specified; and a step of performing control to cause the display device 10 to emit a ray-of-light group L that makes it possible to stereoscopically view the three-dimensional object from an inside of the region E that has been set, and makes it impossible to stereoscopically view the three-dimensional object from an outside of the region E.

By doing this, the program enables the information processing apparatus 30 to limit a range in which rays of light of a three-dimensional object will be reproduced. Therefore, even if a processing load relating to emission of rays of light of the information processing apparatus 30 is reduced, the observer 200 is enabled to visually recognize a stereoscopic image by using rays of light that have been emitted by the display device 10. Furthermore, the program enables the information processing apparatus 30 to set a region E that uses a viewpoint position of the observer 200 as a reference. Even if the viewpoint position slightly deviates, the observer 200 is enabled to visually recognize a stereoscopic image, by setting a region E according to a movement of the head of the observer 200. Stated another way, the program can provide the observer 200 with depth perception that is similar to depth perception in a case where rays of light are emitted omnidirectionally, by using a ray-of-light group that the display device 10 has emitted to a limited region E. Furthermore, the program enables a reproduction range having a wide viewing area and a wide depth to be achieved, even if a display device that can omnidirectionally emit rays of light is not used.

Note that the configuration described below also falls under the technical scope of the present disclosure.

(1)

An information processing apparatus including:
- a specification unit that specifies a viewpoint position of an observer of a display device that reproduces rays of light that have been sent out by a three-dimensional object;
- a setting unit that sets a region that makes it possible for the observer to stereoscopically view the three-dimensional object, by using, as a reference, the viewpoint position that has been specified by the specification unit; and
- a display control unit that performs control to cause the display device to emit a ray-of-light group that makes it possible to stereoscopically view the three-dimensional object from an inside of the region that has been set by the setting unit, and makes it impossible to stereoscopically view the three-dimensional object from an outside of the region.

(2)

The information processing apparatus according to (1) described above,
- in which the display control unit calculates a pixel value for the display device to emit the ray-of-light group that passes through the inside of the region toward the observer, and controls the display device on the basis of the pixel value.

(3)

The information processing apparatus according to (1) or (2) described above, further including:
- a detection unit that detects a movement of the viewpoint position of the observer, wherein, when the detection unit has detected the movement of the viewpoint position, the setting unit sets the region by using the viewpoint position after the movement as a reference, and when the region according to the viewpoint position after the movement has been set by the setting unit, the display control unit performs control to cause the display device to emit the ray-of-light group that makes it possible to stereoscopically view the three-dimensional object from the inside of the region.

(4)

The information processing apparatus according to (3) described above, in which, when the detection unit has detected a movement of the viewpoint position from the inside to the outside of the region, the setting unit sets the region by using, as a reference, the viewpoint position after the movement.

(5)

The information processing apparatus according to (3) or (4) described above, in which, when the region according to the movement of the viewpoint position has been set by the setting unit, the display control unit compares a current ray-of-light group that passes through the region with a virtual ray-of-light group desired to reproduce the three-dimensional object, and reflects a result of comparison in the ray-of-light group to be emitted from the display device.

(6)

The information processing apparatus according to (5) described above, in which the display control unit calculates the current ray-of-light group that passes through the region from the display device, and in a case where an error between the current ray-of-light group that has been calculated and the virtual ray-of-light group satisfies change conditions, the ray-of-light group to be emitted from the display device is changed in such a way that the error becomes smaller.

(7)

The information processing apparatus according to any of (1) to (6) described above, in which the setting unit sets a single region that includes a plurality of the viewpoint positions of both eyes of the observer, the plurality of the viewpoint positions having been specified by the specification unit.

(8)

The information processing apparatus according to any of (1) to (7) described above, in which the setting unit sets a plurality of the regions having sizes different from each other on the basis of a precision of the viewpoint position that has been specified by the specification unit.

(9)

The information processing apparatus according to (3) described above, in which, in a case where the movement of the viewpoint position has been detected by the detection unit, the setting unit sets the region that is larger than the region in a case where the viewpoint position is stationary.

(10)

The information processing apparatus according to (3) described above, in which the detection unit detects the viewpoint positions of a plurality of the observers, the setting unit sets a plurality of the regions each of which corresponds to each of the plurality of the observers, and the display control unit performs control to cause the display device to emit a ray-of-light group that makes it possible to stereoscopically view the three-dimensional object from an inside of the plurality of the regions that has been set by the setting unit, and makes it impossible to stereoscopically view the three-dimensional object from an outside of the plurality of the regions.

(11)

An information processing method performed by an information processing apparatus that controls a display device that reproduces rays of light that have been sent out by a three-dimensional object, the information processing method including:

a step of specifying a viewpoint position of an observer of the display device;

a step of setting a region that makes it possible for the observer to stereoscopically view the three-dimensional object, by using, as a reference, the viewpoint position that has been specified; and a step of performing control to cause the display device to emit a ray-of-light group that makes it possible to stereoscopically view the three-dimensional object from an inside of the region that has been set, and makes it impossible to stereoscopically view the three-dimensional object from an outside of the region.

(12)

A program that causes an information processing apparatus that controls a display device that reproduces rays of light that have been sent out by a three-dimensional object to perform:

a step of specifying a viewpoint position of an observer of the display device;

a step of setting a region that makes it possible for the observer to stereoscopically view the three-dimensional object, by using, as a reference, the viewpoint position that has been specified; and a step of performing control to cause the display device to emit a ray-of-light group that makes it possible to stereoscopically view the three-dimensional object from an inside of the region that has been set, and makes it impossible to stereoscopically view the three-dimensional object from an outside of the region.

(13)

A display system including:

a display device that reproduces rays of light that have been sent out by a three-dimensional object; and an information processing apparatus that controls the display device, in which the information processing apparatus includes:

a specification unit that specifies a viewpoint position of an observer of the display device;

a setting unit that sets a region that makes it possible for the observer to stereoscopically view the three-dimensional object, by using, as a reference, the viewpoint position that has been specified by the specification unit; and a display control unit that performs control to cause the display device to emit a ray-of-light group that makes it possible to stereoscopically view the three-dimensional object from an inside of the region that has been set by the setting unit, and makes it impossible to stereoscopically view the three-dimensional object from an outside of the region.

REFERENCE SIGNS LIST

10 Display device
11 Liquid crystal panel
20 Measurement device
30 Information processing apparatus
31 Communication unit
32 Storage
33 Control unit
200 Observer
331 Specification unit
332 Setting unit
333 Display control unit
334 Detection unit
E Region
EP Viewpoint position
L Ray-of-light group

The invention claimed is:

1. An information processing apparatus comprising:
circuitry configured to
determine whether a viewpoint of an observer of a stereoscopic display device configured to reproduce rays of light of a three-dimensional object is at a first viewpoint position of a three-dimensional space,
set a stereoscopic region that allows the observer to stereoscopically view the three-dimensional object,
control the stereoscopic display device to emit a ray-of-light group including a plurality of rays into an inside of the stereoscopic region and toward the observer, wherein pixel values of the plurality of rays are different from each other,
detect a movement of the viewpoint of the observer from the first viewpoint position to a second viewpoint position different from the first viewpoint position, and
move, to the second viewpoint position, the stereoscopic region and reset the pixel values of the plurality of rays on a basis of the detection of the movement of the viewpoint of the observer.

2. The information processing apparatus according to claim 1,
wherein the circuitry moves the stereoscopic region to the second viewpoint position after the viewpoint of the observer goes out from the stereoscopic region.

3. The information processing apparatus according to claim 1,
wherein the circuitry is further configured to control the stereoscopic display device to change the ray-of-light group on a basis of a comparison of a current ray-of-light group corresponding to the first viewpoint position with a virtual ray-of-light group corresponding to the second viewpoint position.

4. The information processing apparatus according to claim 3,
wherein the circuitry controls the stereoscopic display device to change the ray-of-light group to reduce an error between the current ray-of-light group and the virtual ray-of-light group.

5. The information processing apparatus according to claim 1,
wherein the circuitry is further configured to
set, as the stereoscopic region, a single region that includes a left eye viewpoint position and a right eye viewpoint position of the observer, and
prohibit the stereoscopic display device from emitting the ray-of-light group into a region adjacent to the single stereoscopic region.

6. The information processing apparatus according to claim 1,
wherein the viewpoint of the observer includes a first viewpoint and a second viewpoint,
wherein the stereoscopic region includes a first stereoscopic region and a second stereoscopic region corresponding to the first viewpoint and the second viewpoint respectively,
wherein a specification precision of the first stereoscopic region is less than that of the second stereoscopic region, and
wherein the first stereoscopic region has a larger size than that of the second stereoscopic region.

7. The information processing apparatus according to claim 1,
wherein the circuitry is further configured to set, on the basis of the detection of the movement of the viewpoint of the observer, the stereoscopic region larger than that in a case where the viewpoint of the observer is stationary.

8. The information processing apparatus according to claim 1,
wherein the observer includes a first observer and a second observer,
wherein the stereoscopic region includes a first stereoscopic region and a second stereoscopic region corresponding to the first observer and the second observer respectively,
wherein the circuitry is further configured to set a non-stereoscopic region between the first stereoscopic region and the second stereoscopic region, and
wherein the non-stereoscopic region includes no ray-of-light group allowing the first observer and the second observer to stereoscopically view the three-dimensional object.

9. An information processing method performed by an information processing apparatus configured to control a stereoscopic display device that reproduces rays of light of a three-dimensional object, the information processing method comprising:
determining whether a viewpoint of an observer of the stereoscopic display device is at a first viewpoint position of a three-dimensional space;
setting a stereoscopic region that allows the observer to stereoscopically view the three-dimensional object;
controlling the stereoscopic display device to emit a ray-of-light group including a plurality of rays into an inside of the stereoscopic region and toward the observer, wherein pixel values of the plurality of rays are different from each other;
detecting a movement of the viewpoint of the observer from the first viewpoint position to a second viewpoint position different from the first viewpoint position; and
moving, to the second viewpoint position, the stereoscopic region and resetting the pixel values of the plurality of rays on a basis of the detection of the movement of the viewpoint of the observer.

10. A non-transitory computer-readable storage medium having embodied thereon a program, which when executed by an information processing apparatus causes the information processing apparatus to control a display device that reproduces rays of light that have been sent out by a three-dimensional object by performing a method, the method comprising:
determining whether a viewpoint of an observer of the stereoscopic display device is at a first viewpoint position of a three-dimensional space;

setting a stereoscopic region that allows the observer to stereoscopically view the three-dimensional object;

controlling the stereoscopic display device to emit a ray-of-light group including a plurality of rays into an inside of the stereoscopic region and toward the observer, wherein pixel values of the plurality of rays are different from each other;

detecting a movement of the viewpoint of the observer from the first viewpoint position to a second viewpoint position different from the first viewpoint position; and moving, to the second viewpoint position, the stereoscopic region and resetting the pixel values of the plurality of rays on a basis of the detection of the movement of the viewpoint of the observer.

* * * * *